United States Patent
Du et al.

[19]

[11] Patent Number: 5,856,822
[45] Date of Patent: Jan. 5, 1999

[54] TOUCH-PAD DIGITAL COMPUTER POINTING-DEVICE

[75] Inventors: Sterling S. Du, Palo Alto; Yung-Yu Joe Lee, San Jose, both of Calif.

[73] Assignee: 02 Micro, Inc., Santa Clara, Calif.

[21] Appl. No.: 549,422

[22] Filed: Oct. 27, 1995

[51] Int. Cl.$^6$ ........................................................ G09G 5/08
[52] U.S. Cl. .......................... 345/145; 345/157; 345/173
[58] Field of Search .................................. 345/157, 158, 345/159, 173, 174, 175, 179, 180, 145

[56] References Cited

U.S. PATENT DOCUMENTS

| | | | |
|---|---|---|---|
| 4,734,685 | 3/1988 | Watanabe | 345/157 |
| 5,305,017 | 4/1994 | Gerpheide | 345/174 |
| 5,327,161 | 7/1994 | Logan et al. | 345/157 |
| 5,424,756 | 6/1995 | Ho et al. | 345/158 |

OTHER PUBLICATIONS

Diehl, Stanford, "Touchpads to Navigate By," Byte, p. 150, Oct. 1995.

Primary Examiner—Steven J. Saras
Assistant Examiner—David Lewis
Attorney, Agent, or Firm—Donald E. Schreiber

[57] ABSTRACT

A touch-pad digital computer pointing-device, for controlling a position of a cursor appearing on a display screen of a digital computer, senses and resolves respective locations within an active area at which concurrent multi-finger contacts occur. Multi-finger contacts with the active area activate or deactivate a drag-lock operating mode, computer power conservation, and other touch-pad operating characteristics such as the touch-pad's sensitivity to finger contact. The touch-pad also senses a velocity and direction for finger contact with the active area for use in transmitting data to the computer which effects continuous cursor movement across the computer's display screen in a direction fixed by the initial direction of contact movement across the active area. While there is no finger contact with the active area, the touch-pad monitors the active area and adjusts its operation to compensate for changes in the surrounding environment such as changes in temperature, humidity and atmospheric pressure.

1 Claim, 5 Drawing Sheets

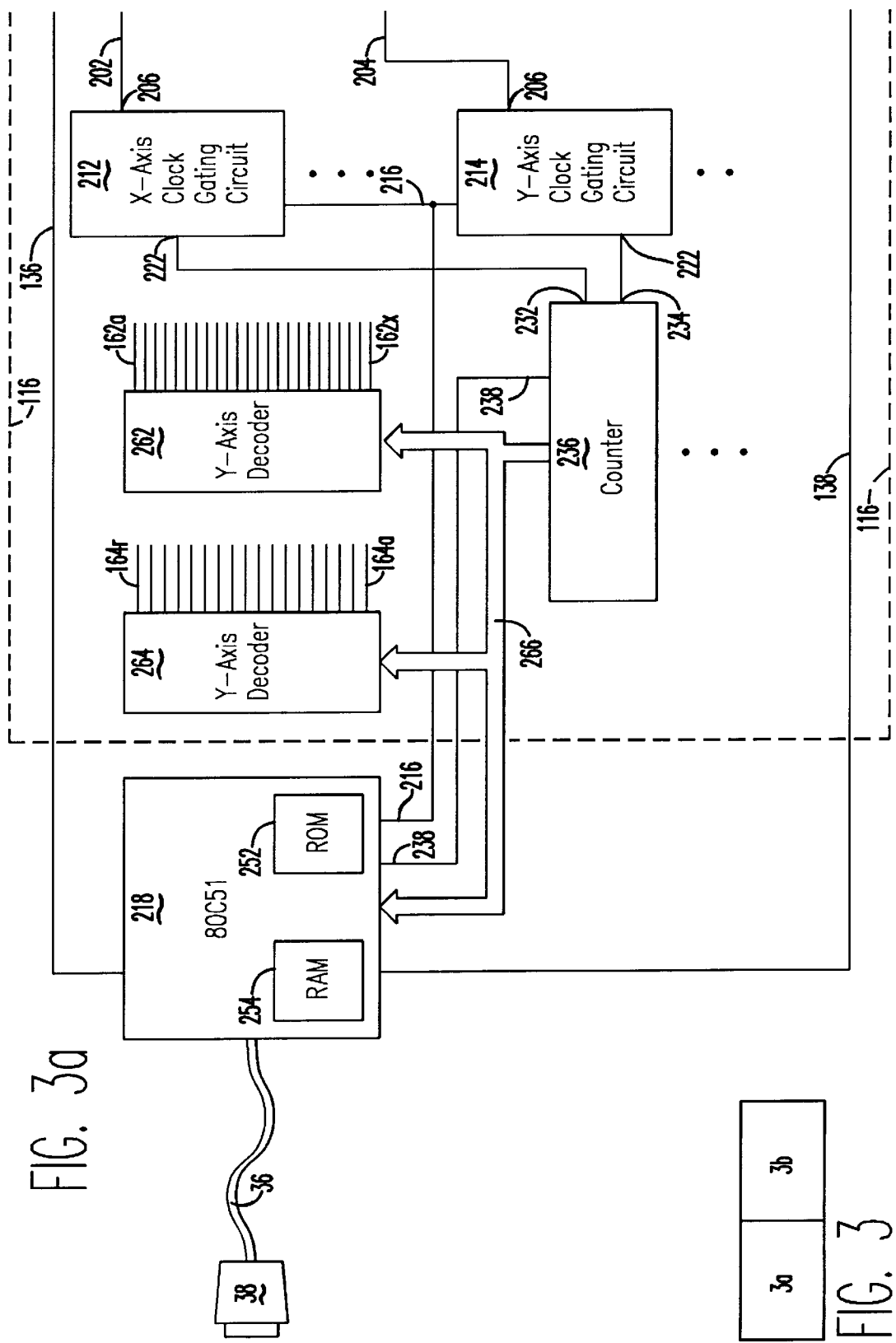

TOUCH-PAD DIGITAL COMPUTER POINTING-DEVICE

BACKGROUND OF THE INVENTION

1. Field of the Invention

The present invention relates generally to pointing-devices used in conjunction with digital computer displays, and, more particularly, to small touch-pads which, in response to a finger's movement across a touch-pad's active area, cause motion of a cursor across a computer's display screen.

2. Description of the Prior Art

Pointing-devices for controlling a cursor on a digital computer's display screen are essential for using a computer that employs a graphic user interface ("GUI"). Various different types of pointing-devices are available such as mice, trackballs, joysticks, digitizer tablets and touch-pads. Each of these different devices exhibits certain limitations.

For example, operating a mouse requires an appreciable amount of free area on a relatively smooth work surface immediately adjacent to the computer. Sliding, i.e. translating, a mouse across such a work surface rolls a ball that is secured within the mouse, and that contacts the surface. Rolling of the ball within the mouse effects a corresponding movement of the cursor across the display screen. Moreover, a computer program that receives the mouse's output signal may filter the mouse's signal to provide special effects. For example, the same translation of a mouse may move the cursor a greater or lesser distance across the computer's screen depending upon the speed of the mouse's translation. However, even with such filtering and even with an appreciable amount of free work surface area, achieving a desired cursor movement frequently requires lifting the mouse and moving it through the air without touching the work surface.

A trackball essentially is a mouse turned upside down. Consequently, rather than rolling a ball by translating the trackball's base across a surface, the trackball's base remains fixed and one rolls the ball directly with a finger. Consequently, a trackball enjoys an advantage over a mouse in that it requires only a fixed amount of space on a desk, or in a laptop or notebook personal computer. However, a trackball experiences problems with contamination because it must have an upward facing opening around the ball through which dust particles may enter its mechanism. Trackballs may also experience contamination problems if they are manipulated by a dirty finger.

A joystick is an elongated member that usually protrudes upward from a fixed base. A joystick converts a displacement of the elongated member from a pre-established neutral position into a continuous movement of the cursor displayed on a computer's screen. Consequently, a displacement of the joystick does not provide absolute control over the cursor's position as does the movement of a mouse or trackball. Rather, at best a joystick controls only the direction and speed of the cursor's movement. Therefore, several successive joystick displacements may be required to position a cursor at a desired location on a computer's screen.

As contrasted with a mouse, a trackball, or a joystick; a digitizer tablet permits immediately specifying, usually using a special stylus, an exact position at which a cursor is to be located on a computer's display screen. However, the one-to-one correlation between positions on a digitizer tablet's working surface and positions on the computer's display screen requires that an adequately high resolution digitizer be a physically large device. Consequently, generally a digitizer tablet is unsuitable for use with a laptop or notebook personal computer.

Particularly for laptop or notebook personal computers, touch-pads alleviate many of the problems experienced with other types of pointing-devices. Touch-pads are small digitizer tablets that, similar to a mouse or trackball, provide relative rather than absolute control over a cursor's position usually in response to a finger's movement across the touch-pad's active area. Similar to a trackball, touch-pads occupy only a small, fixed amount of work surface area. Moreover, a touch-pad may be sealed so it doesn't suffer from the contamination problems generally experienced by trackballs. However, because a touch-pad is physically small, effecting large cursor movements across a computer's display screen may require several successive finger strokes across the touch-pad's active area. To address this particular limitation of touch-pads, U.S. Pat. No. 5,327,161 ("the '161 patent"), which issued on an application filed by James D. Logan and Blair Evans, discloses a touch-pad which, similar to a joystick, causes a cursor on a computer's display screen to continue moving in a pre-established direction even though finger movement across the touch-pad's active area halts. This patent discloses that continued cursor motion occurs if a finger moving across the touch-pad's active area enters a pre-established border area at the perimeter of the active area. Alternatively, this patent discloses that continued cursor motion can occur upon activation of a mechanical "drag switch," disposed beneath the touch-pad, in combination a finger movement across the touch-pad's active area.

A limitation of the techniques for simulating a large touch-pad active area disclosed in the '161 patent are that inadvertently entering the border area, or inadvertently pressing too hard on the touch-pad, automatically triggers continued cursor motion. Consequently, at times the touch-pad disclosed in the '161 patent may exhibit difficulty in positioning a cursor analogous to the difficulty sometimes experienced with a joystick. Moreover, dedication of the touch-pad's border area for sensing only continued cursor motion reduces the amount of touch-pad active area that provides relative cursor positioning.

SUMMARY OF THE INVENTION

An object of the present invention is to provide a touch-pad that requires no border area or a mechanical drag switch for effecting continuous cursor movement across a computer's display screen.

Another object of the present invention is to provide a touch-pad that provides both continuous cursor movement across a computer's display screen, and relative cursor positioning throughout the touch-pad's entire active area.

Another object of the present invention is to provide a touch-pad that does not require pressing a key to effect drag-lock operation.

Another object of the present invention is to provide a touch-pad that can accept and utilize simultaneous multi-finger contacts with the touch-pad's active area.

Another object of the present invention is to provide a touch-pad that permits operator control over a laptop or notebook computer's power management capabilities.

Another object of the present invention is to provide a touch-pad that provides direct touch-pad control of the touch-pad's operating characteristics.

Another object of the present invention is to provide a touch-pad that adapts its operation to environmental conditions such as temperature, humidity, and atmospheric pressure.

Another object of the present invention is to provide a touch-pad for laptop or notebook computers that facilitates adding an external mouse or trackball as an auxiliary input device.

Another object of the present invention is to provide a touch-pad for laptop or notebook computers that permits adding an external mouse or trackball as an auxiliary input device while maintaining operation of all active computer programs.

Another object of the present invention is to provide a touch-pad for attachment to a host computer that includes the preceding advantages, and which does not require the use of a driver computer program executed by the host computer.

Briefly the present invention is a touch-pad digital computer pointing-device that permits controlling a position of a cursor appearing on a display screen of a digital computer. The touch-pad includes an active area that responds to both single and concurrent multi-finger contacts. Furthermore, the touch-pad senses and resolves respective locations within the active area at which concurrent multi-finger contacts occur. A computer port interface, included in the touch-pad, responds to finger contacts with the active area by transmitting data to a digital computer that indicates a finger contact in the active area.

Accordingly, if the touch-pad is not presently operating in a drag-lock operating mode, the touch-pad activates a drag-lock operating mode if the touch pad senses a first contact with the active area while concurrently sensing a second contact within a pre-established specific location in the active area. Alternatively, if the touch-pad is presently operating in a drag-lock operating mode, while one finger contacts another area on the touch-pad a subsequent contact with the pre-established specific location deactivates the drag-lock operating mode.

The touch-pad also responds to concurrent multi-finger contacts within pre-established specific locations in the active area that persist throughout a pre-established time-interval. In one instance, such touch-pad operation transmits a control signal to a digital computer coupled to the touch-pad. The computer, particularly a laptop or notebook computer, may respond to this control signal by activating or deactivating a low-power "suspend" operating mode. In other instances, such touch-pad operation alters various touch-pad operating characteristics such as the touch-pad's sensitivity to finger contact.

The touch-pad also senses a velocity and direction at which a contact to the touch-pad moves across the active area. If the contact velocity exceeds a pre-established threshold, the touch-pad alters a characteristic of data subsequently transmitted to the digital computer. In particular, after sensing such a high velocity contact with the active area, upon the contact's subsequently slowing down or even becoming stationary, the touch-pad alters the transmitted data to effect continuous cursor movement across the display screen in a direction fixed by the initial direction of contact movement across the active area.

If the touch-pad is not sensing a contact with the active area, the touch-pad also records a quantity indicative of the response of the active area to finger contact. The touch-pad then uses the recorded quantity in adjusting a threshold for sensing a subsequent contact with the active area. In this way the touch-pad compensates for changes in environment surrounding the touch-pad such as temperature, humidity and atmospheric pressure.

A touch-pad in accordance with the present invention may be implemented in two distinctly different embodiments. In one embodiment, the touch-pad is external to the digital computer and communicates with the digital computer through the computer's serial port. In another embodiment, particularly useful for a laptop or notebook computer, the touch-pad is physically incorporated into the computer's structure. In such an integrated embodiment, the touch-pad also provides a second serial port for coupling a mouse or trackball that is external to the laptop or notebook computer. Moreover, such an external auxiliary input device may be plugged into the computer's second serial port while computer programs are executing, i.e the auxiliary input device may be "hot plugged" into the computer.

These and other features, objects and advantages will be understood or apparent to those of ordinary skill in the art from the following detailed description of the preferred embodiment as illustrated in the various drawing figures.

DETAILED DESCRIPTION OF THE PREFERRED EMBODIMENT

Figure 1:
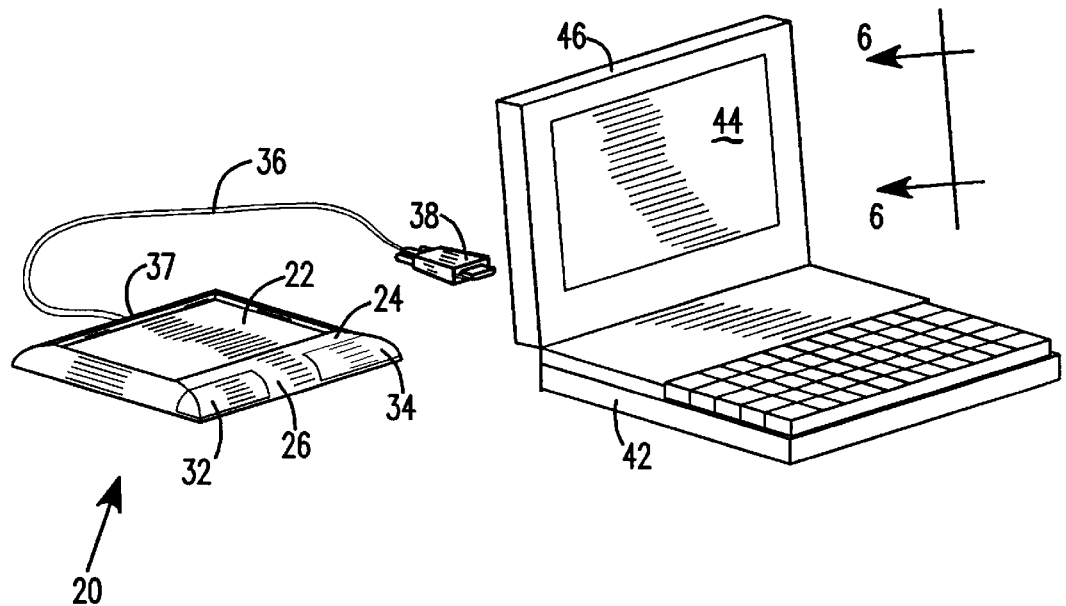
FIG. 1 is a perspective view depicting a touch-pad digital computer pointing-device in accordance with the present invention that is adapted for coupling to a serial port of a laptop or notebook computer also depicted in FIG. 1.

Referring now to FIG. 1, depicted there is a touch-pad in accordance with the present invention referred to by the general reference character 20. The touch-pad 20 includes a 2.64 inch by 2.0 inch active area 22 that is surrounded by an escutcheon 24. Disposed at opposite ends of a relatively wide front edge 26 of the escutcheon 24 are respectively a left button 32 and a right button 34. The left and right buttons 32 and 34 operate the same as left and right buttons on a conventional digital computer mouse or trackball. The touch-pad 20 also includes a cable 36 one end of which passes through a rear edge 37 of the escutcheon 24. Secured to the other end of the cable 36 is a serial-port connector 38. The serial-port connector 38 permits connecting the touch-pad 20 to a serial port of a digital computer such as a laptop or notebook computer 42 depicted in FIG. 1. The computer 42 includes a display screen 44 that is secured within an upper half 46 of the computer 42. During execution of a computer program that employs a GUI, a cursor appears on the display screen 44.

Figure 2:
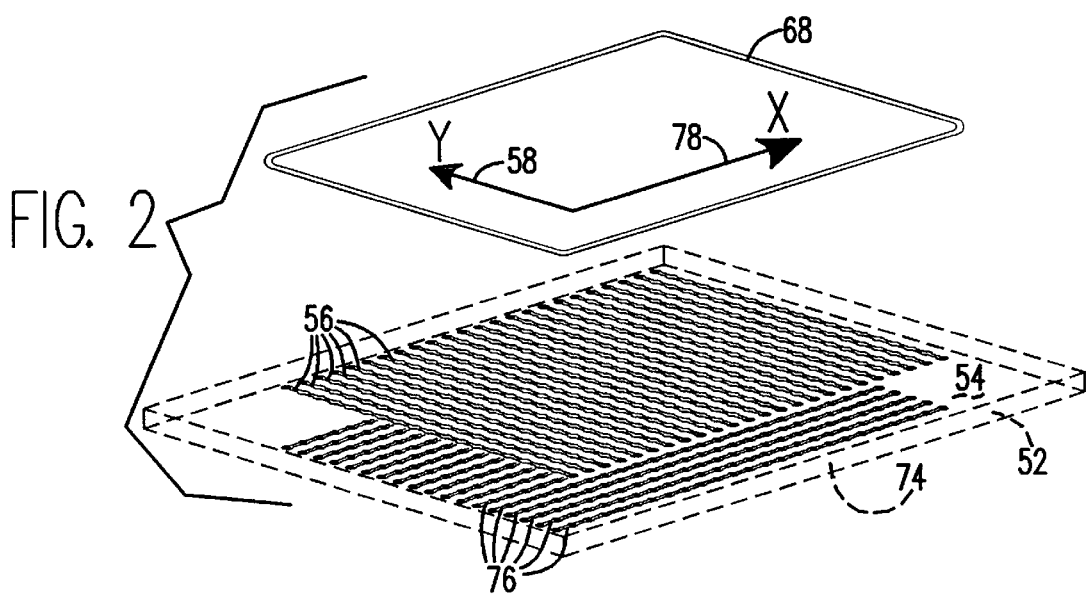
FIG. 2 is an exploded, perspective view of a preferred embodiment of an active area of the touch-pad depicted in FIG. 1 that employs capacitance for sensing finger contact with the active area.

Referring now to FIG. 2, the active area 22 consists of a double sided printed circuit board 52, depicted with dashed lines, that is approximately seventy one-hundredths (0.070) of an inch thick. The printed circuit board 52 has an upper surface 54 on which are preferably formed twenty-four (24) parallel, elongated, electrically-conductive X-axis sensing-traces 56. The X-axis sensing-traces 56 are aligned parallel to a Y-axis 58 of the active area 22. As more clearly depicted in FIG. 3b, each X-axis sensing-trace 56 includes a repeating pattern consisting of a rectangularly-shaped bar 62 at one end of which is a solid, circularly-shaped disk 64. Immediately adjacent disks 64 are spaced approximately 0.11 inches apart, which is also the spacing between immediately adjacent X-axis sensing-traces 56. An annularly-shaped terminal eyelet 66 terminates both ends of each X-axis sensing-trace 56 to permit forming an electrical connection thereto. A separate guard ring 68, which surrounds the X-axis sensing-traces 56, may also be disposed on the upper surface 54 of the printed circuit board 52. If the printed circuit board 52 includes the guard ring 68, the guard ring 68 is electrically connected to circuit ground.

Referring again to FIG. 2, the printed circuit board 52 has a lower surface 74 on which are preferably formed eighteen (18) parallel, elongated, electrically-conductive Y-axis sensing-traces 76. The Y-axis sensing-traces 76 are aligned parallel to a X-axis 78 of the active area 22. As more clearly depicted in FIG. 3b, each Y-axis sensing-trace 76 includes a repeating pattern consisting of a rectangularly-shaped bar 82 at one end of which is an annularly-shaped eyelet 84. Similar to the X-axis sensing-traces 56, immediately adjacent eyelets 84 are spaced approximately 0.11 inches apart, which is also the spacing between immediately adjacent Y-axis sensing-traces 76. An annularly-shaped terminal eyelet 86 terminates both ends of each Y-axis sensing-trace 76 to permit forming an electrical connection thereto.

Figure 3B:
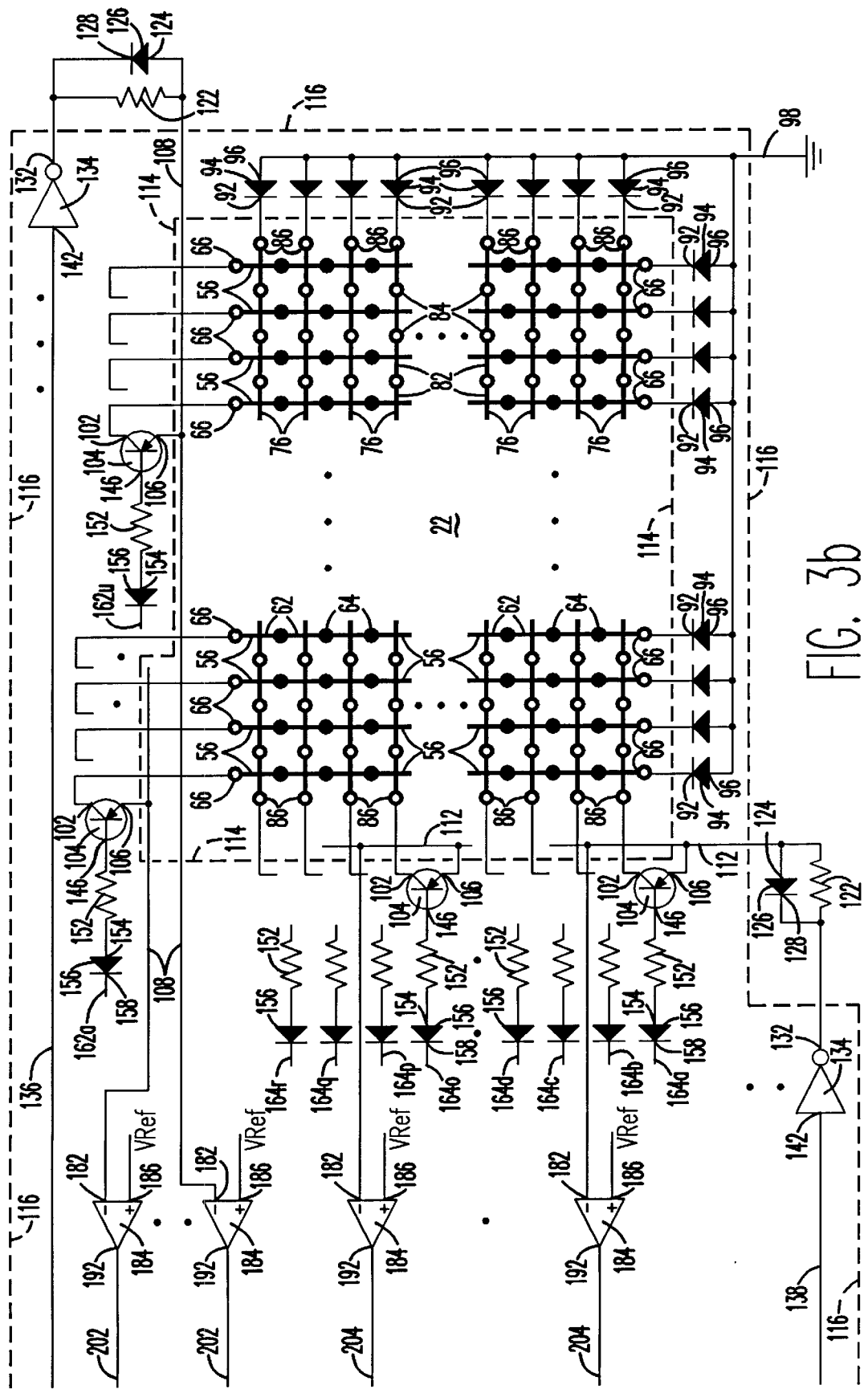
FIG. 3, consisting of FIGS. 3a and 3b, is a block diagram depicting electronic circuits included in a preferred embodiment of the touch-pad that employs capacitance sensing.

As depicted in FIG. 3b, one terminal eyelet 66 and one terminal eyelet 86 respectively of each of the X-axis sensing-traces 56 and Y-axis sensing-traces 76 connects to a cathode 92 of a diode 94. Anodes 96 of each of the diodes 94 connect in parallel to circuit ground 98. The other terminal eyelet 66 and other terminal eyelet 86 respectively of each of the X-axis sensing-traces 56 and Y-axis sensing-traces 76 connects to a collector 102 of a PNP transistor 104. An emitter 106 of each of the PNP transistors 104 connects in parallel respectively either to a X-axis capacitance-charging line 108, or to a Y-axis capacitance-charging line 112. In the preferred embodiment of the touch-pad 20 there are four (4) X-axis capacitance-charging lines 108 and three (3) Y-axis capacitance-charging lines 112. Each of the X-axis capacitance-charging lines 108 and Y-axis capacitance-charging lines 112 connects in parallel to the emitters 106 of six (6) PNP transistors 104. The collectors 102 of the six (6) PNP transistors 104 connect respectively to six (6) immediately adjacent X-axis sensing-traces 56 or Y-axis sensing-traces 76. In this way, the twenty-four (24) X-axis sensing-traces 56 are subdivided by the X-axis capacitance-charging lines 108 into four (4) independent groups each one of which includes six (6) X-axis sensing-traces 56, while the eighteen (18) Y-axis sensing-traces 76 are subdivided by the Y-axis capacitance-charging lines 112 into three (3) independent groups each one of which also includes six (6) Y-axis sensing-traces 76.

As illustrated in FIG. 3b, the diodes 94 and the PNP transistors 104 are all enclosed between a dashed line 114 and a dashed line 116. Enclosing the diodes 94 and the PNP transistors 104 between the dashed lines 114 and 116 illustrates that the diodes 94 and PNP transistors 104, together with all other components of the touch-pad 20 depicted in FIG. 3 that are located between the dashed lines 114 and 116, are preferably all included in a single application specific integrated circuit ("ASIC").

Each of the X-axis capacitance-charging lines 108 and each of the Y-axis capacitance-charging lines 112 connects to a first terminal of a 390 kilo-ohm ("kΩ") resistor 122, and to an anode 124 of a diode 126. A cathode 128 of each of the diodes 126 and a second terminal of each resistor 122 connect in parallel to an output 132 of an inverter 134. As illustrated in FIG. 3b, the resistors 122 and the diodes 126 are outside the dashed lines 114 and 116, and are therefore preferably excluded from the ASIC. Depending upon the state of a logic signal supplied either via a charge-X-axis-trace line 136 or via a charge-Y-axis-trace line 138 to an input 142 of each inverter 134, the electrical potential present at the output 132 of each inverter 134 is either near ground potential or near VCC, which is a negative voltage.

A base 146 of each of the PNP transistors 104 is coupled through a resistor 152 to an anode 154 of a diode 156. A cathode 158 of each of the diodes 156 is coupled either to one (1) of twenty-four (24) X-axis select lines 162a through 162x, or to one (1) of eighteen (18) Y-axis select lines 164a through 164r.

Figure 4:
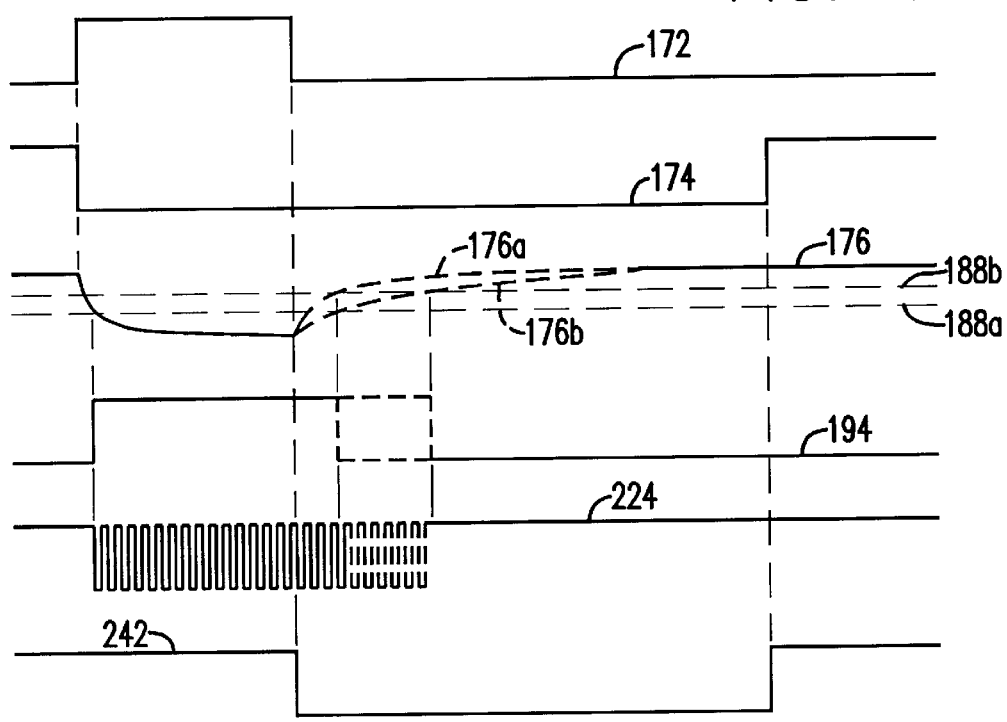
FIG. 4 is a timing diagram depicting waveforms that occur within the electronic circuits depicted in FIG. 3 as those circuits capacitively sense a contact to the touch-pad's active area as depicted in FIG. 2.

FIG. 4 depicts voltage waveforms that occur within the electronic circuits depicted in FIG. 3. A line-charging-pulse waveform 172 illustrates an electrical potential present at the input 142 to any of the inverters 134. As described above, while the input 142 is at a high electrical potential, the electrical potential at the output 132 of the inverter 134 is negative. The negative potential present at the output 132 is coupled through the parallel connected resistor 122 and diode 126 from the output 132 either to one of the X-axis capacitance-charging lines 108, or to one of the Y-axis capacitance-charging lines 112. The emitters 106 of the six (6) PNP transistors 104 connected to the X-axis capacitance-charging line 108 or to the Y-axis capacitance-charging line 112 receive the electrical potential present thereon. To turn-on a particular PNP transistors 104, a negative potential line-selection-pulse waveform 174 is applied to the cathode 158 of one of the diodes 156. Turning-on the PNP transistor 104 couples the negative potential present on the X-axis capacitance-charging line 108 or on the Y-axis capacitance-charging line 112 to the selected X-axis sensing-trace 56 or Y-axis sensing-trace 76. A trace-voltage waveform 176 in FIG. 4 illustrates the electrical potential thus imposed on the selected X-axis sensing-trace 56 or Y-axis sensing-trace 76.

Upon the line-charging-pulse waveform 172 initially having a high electrical potential and the line-selection-pulse waveform 174 initially having a low electrical potential, the trace-voltage waveform 176 present on the X-axis sensing-trace 56 or on the Y-axis sensing-trace 76 immediately begins charging toward a negative VCC potential. During such charging of the X-axis sensing-trace 56 or Y-axis sensing-trace 76, electrical current flows primarily through the diode 126 of the parallel connected diode 126 and resistor 122. Consequently, the X-axis sensing-trace 56 or the Y-axis sensing-trace 76 charges comparatively swiftly toward the VCC potential. Subsequently, when the line-charging-pulse waveform 172 returns to a low electrical potential while the line-selection-pulse waveform 174 remains at a low potential, the electrical potential present on the X-axis sensing-trace 56 or on the Y-axis sensing-trace 76 immediately begins discharging back toward ground potential. However, during such discharging of the X-axis sensing-trace 56 or Y-axis sensing-trace 76, the diode 126 is "back-biased," which prevents current flow through the diode 126. "Back-biasing" of the diode 126, consequently, forces virtually all the electrical current to flow more slowly through only the 390 kΩ resistor 122.

If there exists no finger contact with the active area 22 immediately adjacent to the selected X-axis sensing-trace 56 or Y-axis sensing-trace 76, then the capacitance of the X-axis sensing-trace 56 or Y-axis sensing-trace 76 is lower, and therefore the electrical potential on the X-axis sensing-trace 56 or Y-axis sensing-trace 76 discharges more quickly toward ground potential as indicated by a dashed-line segment 176a of the trace-voltage waveform 176. However, if finger contact with the active area 22 exists immediately adjacent to the X-axis sensing-trace 56 or to the Y-axis sensing-trace 76, then the capacitance of the X-axis sensing-trace 56 or Y-axis sensing-trace 76 increases, and therefore the electrical potential on the X-axis sensing-trace 56 or Y-axis sensing-trace 76 discharges more slowly as indicated by a dashed-line segment 176b of the trace-voltage waveform 176.

Referring again to FIG. 3b, each of the X-axis capacitance-charging lines 108 and Y-axis capacitance-charging lines 112 connects respectively to an inverting input 182 of a comparator 184. Consequently, the touch-pad 20 includes seven (7) comparators 184, four (4) comparators 184 for the four (4) groups of X-axis sensing-traces 56, and three (3) comparators 184 for the three (3) groups of Y-axis sensing-traces 76. A reference voltage VRef, having a potential approximately one-half that of VCC, is supplied to a non-inverting input 186 of each of the comparators 184. Each of the comparators 184 exhibits hysteresis so the comparators 184 do not change state either until the electrical potential present at its inverting input 182 is significantly less than VRef, or is significantly greater than VRef. The threshold voltages for changing state by the comparators 184 are depicted in FIG. 4 by dashed, parallel comparator threshold-lines 188a and 188b. Thus, as the X-axis sensing-trace 56 or the Y-axis sensing-trace 76 initially begins charging, as illustrated by the trace-voltage waveform 176, the electrical potential present at an output 192 of the comparator 184 depicted in a comparator-output waveform 194 remains at a low potential until the trace-voltage waveform 176 descends below the lower comparator threshold-line 188a. After the trace-voltage waveform 176 crosses the comparator threshold-line 188a, the comparator-output waveform 194 changes to a high electrical potential, and remains at that high potential until the trace-voltage waveform 176 subsequently rises above the comparator threshold-line 188b. After the trace-voltage waveform 176 crosses the comparator threshold-line 188b, the comparator-output waveform 194 returns to a low potential.

Referring now to FIG. 3a, the electrical potentials respectively present at each output 192 of the comparators 184 are respectively coupled either by an X-axis comparator-output signal-line 202 or by a Y-axis comparator-output signal-line 204 to an input 206 respectively either of an X-axis clock-gating circuit 212, or of an Y-axis clock-gating circuit 214. Each X-axis clock-gating circuit 212, of which there are four (4) (one X-axis clock-gating circuit 212 for each group of six (6) X-axis sensing-traces 56), receives an eight (8) megahertz ("MHz") clock signal via a clock signal-line 216 from a 80C51 microprocessor 218. Analogously, each Y-axis clock-gating circuit 214, of which there are three (3) (one Y-axis clock-gating circuit 214 for each group of six (6) Y-axis sensing-traces 76), also receives the 8 MHz clock signal from the microprocessor 218 via the clock signal-line 216.

While the electrical potential present at the output 192 of the comparator 184 remains low as indicated by the comparator-output waveform 194 in FIG. 4, the X-axis clock-gating circuit 212 or the Y-axis clock-gating circuit 214 blocks the 8 MHz clock signal from reaching a clock output 222. However, when the trace-voltage waveform 176 descends below the comparator threshold-line 188a and the comparator-output waveform 194 changes to a high potential, the X-axis clock-gating circuit 212 or the Y-axis clock-gating circuit 214 transmits the 8 MHz clock signal to their respective clock outputs 222 as indicated by a clock-output-signal waveform 224 in FIG. 4. The X-axis clock-gating circuit 212 or the Y-axis clock-gating circuit 214 continues transmitting the 8 MHz clock signal to the clock output 222 until the trace-voltage waveform 176 again rises above the comparator threshold-line 188b and the comparator-output waveform 194 returns to a low electrical potential. As is readily apparent from FIG. 4, if there does not exist a finger contact to the active area 22 immediately adjacent to the X-axis sensing-trace 56 or Y-axis sensing-trace 76, the X-axis clock-gating circuit 212 or the Y-axis clock-gating circuit 214 transmits fewer clock pulses from the clock output 222 than are transmitted if a finger contacts the active area 22 immediately adjacent to the X-axis sensing-trace 56 or Y-axis sensing-trace 76.

Referring again to FIG. 3a, the clock outputs 222 of each of the X-axis clock-gating circuits 212 and of the Y-axis clock-gating circuits 214 are respectively connected either to a X-axis clock-input 232 or to a Y-axis clock-input 234 of a two-hundred and fifty-six (256) bit counter 236, of which four (4) are included in the touch-pad 20. Each counter 236 receives a counter reset signal from the microprocessor 218 via a counter-reset signal-line 238. While the electrical potential on the counter-reset signal-line 238 remains at a high potential, as illustrated by the counter-reset-signal waveform 242 in FIG. 4, the counters 236 do not respond to clock signals present at the X-axis clock-input 232 or the Y-axis clock-input 234. However, when the counter-reset-signal waveform 242 changes to a low potential concurrent with the line-charging-pulse waveform 172 also changing to a low potential, the counters 236 begin counting 8 MHz clock pulses present either at their X-axis clock-input 232 or at their Y-axis clock-input 234. Moreover, the counters 236 then continue counting 8 MHz clock pulses until the trace-voltage waveform 176 rises above the comparator threshold-line 188b. Thus, when the line-selection-pulse waveform 174 returns to a high potential each of the counters 236 holds a count that indicates the capacitance of the selected X-axis sensing-trace 56 or Y-axis sensing-trace 76, i.e. that indicates whether or not a finger contacted the active area 22 immediately adjacent to the X-axis sensing-trace 56 or Y-axis sensing-trace 76.

As illustrated in FIG. 3a, the microprocessor 218, which preferably is an 80C51 microprocessor manufactured by Intel Corporation of Santa Clara, Calif., includes both a read only memory ("ROM") 252, and a random access memory ("RAM") 254. The ROM 252 stores a computer program executed by the microprocessor 218 while the RAM 254 stores temporary data used by the computer program in controlling the operation of the touch-pad 20, and in exchanging communications with a digital computer via the cable 36 and serial-port connector 38. As is well known to those skilled in the art, the serial-port connector 38 and cable 36 also supply electrical power to the touch-pad 20 to energize its operation.

The computer program executed by the microprocessor 218 senses the condition of the active area 22 by transmitting control signals to the inverters 134 via the charge-X-axis-trace line 136 or the charge-Y-axis-trace line 138, to the four (4) X-axis clock-gating circuits 212 and the three (3) Y-axis clock-gating circuits 214 via the clock signal-line 216, and to the four (4) counters 236 via the counter-reset signal-line 238; and by exchanging data with the counters 236, a X-axis decoder 262, and a Y-axis decoder 264 via an address-and-data bus 266. Data stored into the X-axis decoder 262 and the Y-axis decoder 264 by the computer program executed by the microprocessor 218 are decoded to provide signals for selecting individual PNP transistors 104. The signals generated by the X-axis decoder 262 and the Y-axis decoder 264 for selecting individual PNP transistors 104 are transmitted from the X-axis decoder 262 to the X-axis PNP transistors 104 via the X-axis select lines 162a through 162x, and are transmitted from the Y-axis decoder 264 to the Y-axis PNP transistors 104 via the Y-axis select lines 164a through 164r.

To initiate sensing the condition of the active area 22, the computer program executed by the microprocessor 218 transmits control signals via either the charge-X-axis-trace line 136 or the charge-Y-axis-trace line 138 either to all four (4) of the X-axis inverters 134 or to all three (3) Y-axis inverters 134 to activate either all four (4) X-axis capacitance-charging lines 108 or all three (3) Y-axis capacitance-charging lines 112. Concurrently, the computer program executed by the microprocessor 218 stores data via the address-and-data bus 266 into either the X-axis decoder 262 or into the Y-axis decoder 264. The X-axis decoder 262 or the Y-axis decoder 264 respectively decodes such data to select for charging one X-axis sensing-trace 56 or Y-axis sensing-trace 76 out of each group of six (6) X-axis sensing-traces 56 or Y-axis sensing-traces 76. Subsequently, the computer program executed by the microprocessor 218 terminates charging of the four (4) selected X-axis sensing-traces 56 or the three (3) selected Y-axis sensing-traces 76 by changing the line-charging-pulse waveform 172 present either on the charge-X-axis-trace line 136 or on the charge-Y-axis-trace line 138 from a high to a low potential, while concurrently releasing the counters 236 by changing the counter-reset-signal waveform 242 present on the counter-reset signal-line 238 from a high to a low potential. At the end of the discharge interval, the computer program executed by the microprocessor 218 stores data via the address-and-data bus 266 either into the X-axis decoder 262 or into the Y-axis decoder 264 which de-selects the X-axis sensing-traces 56 or the Y-axis sensing-traces 76, while concurrently retrieving via the address-and-data bus 266 the counts then present in each of the four (4) counters 236.

In this way the computer program executed by the microprocessor 218 repetitively scans all the X-axis sensing-traces 56 and then all the Y-axis sensing-traces 76 to determine X and Y coordinates at which one or more fingers contact the active area 22. If in sensing the condition of the active area 22 the computer program executed by the microprocessor 218 senses finger contact at two or more immediately adjacent X-axis sensing-traces 56 or immediately adjacent Y-axis sensing-traces 76, it filters such data to assign a unique X-axis and/or Y-axis coordinate to each finger contact. Moreover, the computer program executed by the microprocessor 218 may also analyze sensing finger contact at two or more immediately adjacent X-axis sensing-traces 56 or Y-axis sensing-traces 76 to evaluate how much finger pressure is applied to the active area 22.

If the computer program executed by the microprocessor 218 does not sense a finger contact with the touch-pad 20 it begins recording data that indicates the capacitance of the X-axis sensing-trace 56 and the Y-axis sensing-trace 76 in the absence of a finger contact. If there is no finger contact throughout a time interval that exceeds 2 milliseconds, preferably 5 milliseconds, the computer program then adjusts data values stored in the RAM 254 which specify a threshold for sensing a finger contact with the active area 22. In this way, the touch-pad 20 compensates for changes in environment surrounding the touch-pad such as temperature, humidity, and atmospheric pressure.

In addition to sensing individual and multiple finger contacts to the active area 22 of the touch-pad 20, the computer program executed by the microprocessor 218 also exchanges data with the computer 42 via the cable 36 and the serial-port connector 38. In effecting such exchanges of data with the computer 42, the computer program executed by the microprocessor 218 emulates operation of a conventional mouse or trackball. Accordingly, the touch-pad 20 may be used with any computer 42 with which a conventional mouse or trackball may be used.

Figure 5:
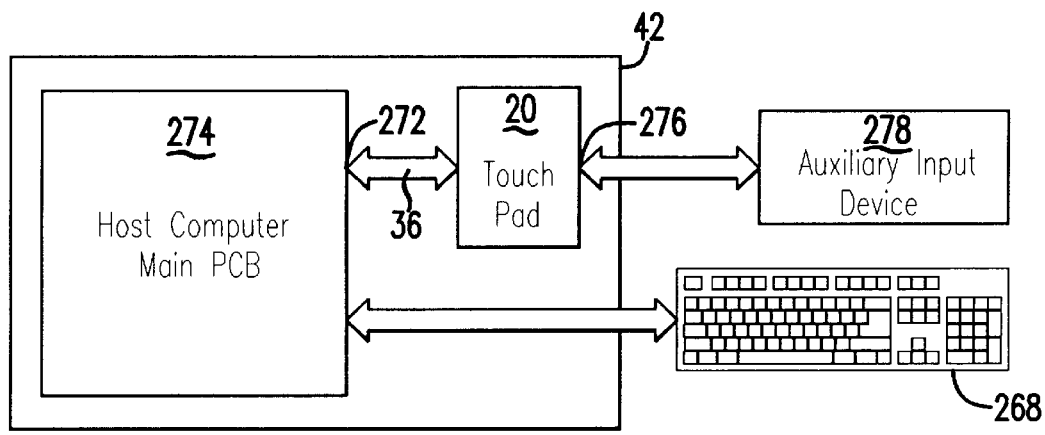
FIG. 5 is a block diagram depicting a computer having a touch-pad in accordance with the present invention integrated therein.

While the touch-pad 20 has been described thus far as a unit separate and distinct from the computer 42, it is readily apparent that the touch-pad 20 may be physically incorporated into a laptop or notebook computer 42. Incorporation of the touch-pad 20 into a computer 42 permits directly coupling both an external keyboard 268 to a host computer main printed circuit board ("PCB") 274, and the touch-pad 20 to a primary serial port 272 of the main PCB 274, as depicted in FIGS. 5. However, the touch-pad 20 thus incorporated into the computer 42 may also provide a secondary serial port 276 for coupling to the computer 42 an external auxiliary input device 278 such as a mouse or trackball. If the active area 22 provides a secondary serial port 276 for a computer 42, the computer program executed by the microprocessor 218 in addition to communicating with the computer 42 via the cable 36 and the serial-port connector 38, also exchanges data with the auxiliary input device 278 For a computer 42 having the configuration depicted in FIG. 5, both the touch-pad 20 and the auxiliary input device 278 are active, and either may be used as an input device to the computer 42. However, if both the touch-pad 20 and the auxiliary input device 278 attempt to provide input data to the computer 42 simultaneously, input data from the touch-pad 20 takes precedence over that from the auxiliary input device 278. Moreover, the auxiliary input device 278 may be "hot plugged" into the secondary serial port 276 during execution of computer programs by a microprocessor included in the main PCB 274 without adversely impacting the operation of such computer programs, and to immediately commence operation as an input device for controlling cursor position.

The touch-pad 20 of the present invention is capable of sensing and resolving concurrent contacts of multiple fingers to the active area 22. That is, as the computer program executed by the microprocessor 218 repetitively scans the X-axis sensing-traces 56 and the Y-axis sensing-traces 76, if two or more fingers concurrently contact the active area 22, the computer program senses contacts either at two different X-axis locations on the active area 22, or at two different Y-axis locations, or at two different X-axis and two different Y-axis locations. The ability of the computer program executed by the microprocessor 218 to sense concurrent multi-finger contacts with the active area 22 permits the touch-pad 20 to perform a variety of useful functions in response to such multi-finger contacts at different specific locations within the active area 22.

Figure 6:
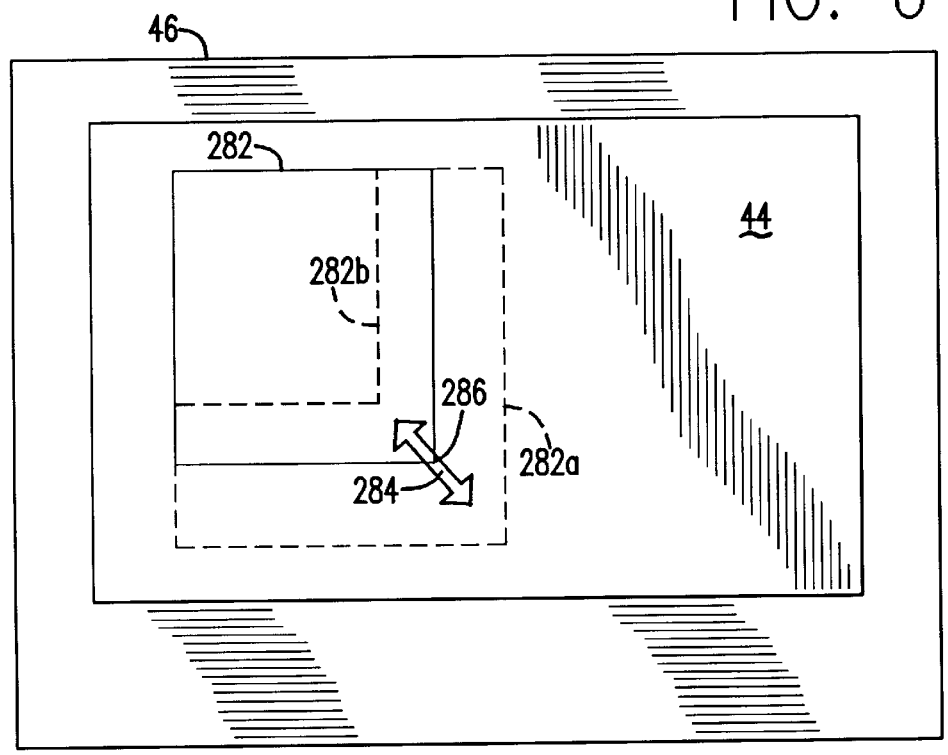
FIG. 6 is a elevational view of a computer display screen taken along the line 6—6 in FIG. 1 that graphically depicts a drag-lock operation.

Referring now to FIG. 6, depicted there is an elevational view of the display screen 44 of the computer 42 depicted in FIG. 1 on which appears a window-outline 282 generated by a GUI. Window operations commonly permitted by a GUI include either moving the window-outline 282 to another location on the display screen 44, or changing the size of the window-outline 282. FIG. 6 graphically illustrates changing the size of the window-outline 282 by positioning a double-headed arrow 284 at a lower right-hand corner 286 of the window-outline 282. Once the double-headed arrow 284 appears on the display screen 44, performing a "drag-lock" operation by concurrently pressing both one button of a conventional mouse or trackball while moving either the mouse or the trackball permits enlarging or reducing the size of the window-outline 282, as indicated by the dashed-line window-outlines 282a and 282b. Due to the small physical size of the active area provided by touch-pads, it is awkward to perform a drag-lock operation by pressing one button of a conventional touch-pad while concurrently moving a finger across the conventional touch-pad's active area.

Figure 7:
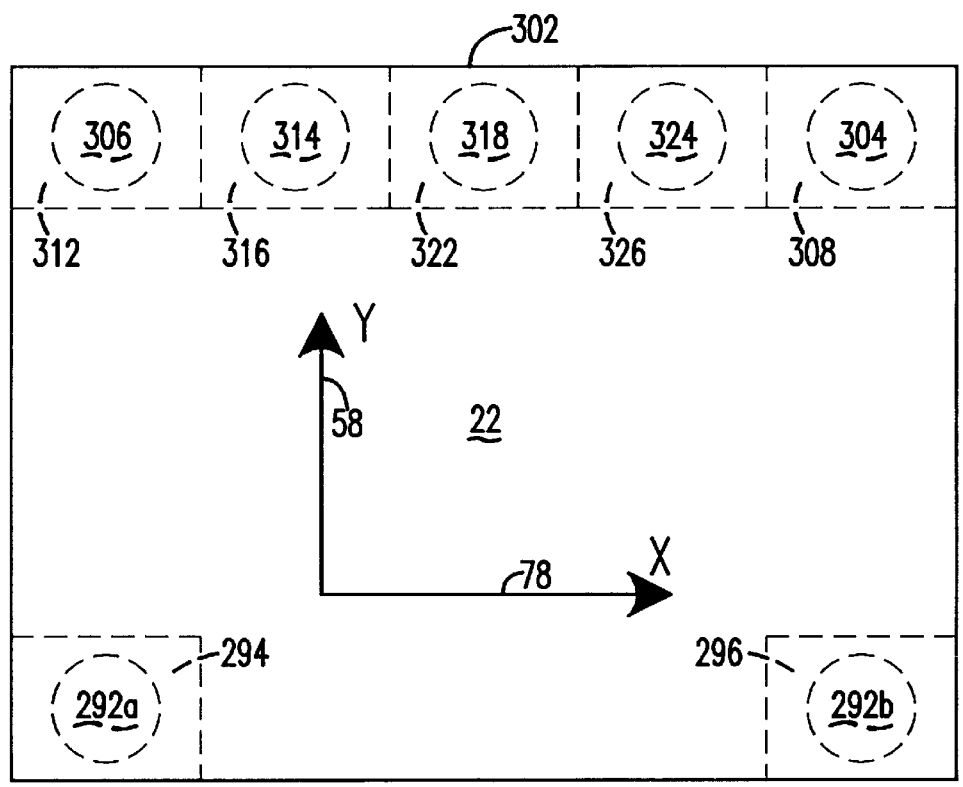
FIG. 7 is a plan view depicting the touch-pad's active area illustrating pre-established specific locations within the active area which permit access to special touch-pad functions.

Referring now to FIG. 7, the touch-pad 20 of the present invention permits performing a drag-lock operation easily by contacting one finger to the active area 22 while concurrently contacting a second finger within a pre-established specific location in the active area 22. Specifically, a concurrent second finger contact 292a or 292b, respectively illustrated by dashed-line circles in FIG. 7, in either a lower left-hand corner 294 or a lower right-hand corner 296 of the active area 22, respectively demarcated in FIG. 7 by dashed-lines, initially activates a drag-lock operating mode of the touch-pad 20. After the touch-pad 20 enters its drag-lock operating mode, it remains in that operating mode even if finger contact with the active area 22 ceases. However, a subsequent finger contact within either the lower left-hand corner 294 or the lower right-hand corner 296 of the active area 22 while another finger contacts some other area on the active area 22 deactivates the drag-lock operating mode.

Moreover, in response to concurrent finger contacts both within the lower left-hand corner 294 and within the lower right-hand corner 296 which persist for a pre-established time-interval longer than one-half second, preferably one second, the touch-pad 20 transmits a control signal to the computer 42 via a normally unused pin in the serial-port connector 38. A power management computer program executing within the computer 42 that senses transmission of this control signal by the touch-pad 20 can respond to the signal by activating a low-power suspend operating mode of the computer 42, if the computer 42 is not already operating in the suspend operating mode. Conversely, if the computer 42 is already operating in the suspend operating mode, then, in response to the control signal, the computer program executed by the computer 42 deactivates the low-power suspend operating mode.

In addition to the pre-established specific locations in the lower left-hand corner 294 and the lower right-hand corner 296, the touch-pad 20 also includes five (5) additional pre-established specific locations arranged in a horizontal row along an upper edge 302 of the active area 22. Concurrent finger contacts with particular pairs of these specific locations which persist for a pre-established time-interval longer than one-half second, preferably one second, alter particular operating characteristics of the touch-pad 20. Thus, a first finger contact 304 and a second finger contact 306, respectively illustrated by dashed-line circles in FIG. 7, in an upper right-hand corner 308 and in an upper left-hand corner 312 of the active area 22, respectively demarcated in FIG. 7 by dashed-lines, which persist for the pre-established time-interval select either a greater or a lesser increase in cursor translation for the same finger contact movement speed. That is, if the active area 22 is operating with the lesser increase in cursor translation when the finger contacts 304 and 306 occur, then the touch-pad 20 establishes the greater increase in cursor translation for the same contact movement speed. Conversely, if the active area 22 is operating with the greater increase in cursor translation when the finger contacts 304 and 306 occur, then the touch-pad 20 establishes the lesser increase in cursor translation.

A first finger contact 304 in the upper right-hand corner 308 concurrent with a second finger contact 314 in a pre-established specific location 316 of the active area 22 which persist for the pre-established time-interval interchanges X and Y coordinate axes of the touch-pad 20.

A first finger contact 304 in the upper right-hand corner 308 concurrent with a second finger contact 318 in a pre-established specific location 322 of the active area 22 which persist for the pre-established time-interval alters a pre-established threshold for sensing finger contact with the active area 22. Specifically, the touch-pad 20 operates either with a lower pre-established threshold for sensing finger contact with the active area 22 or with a higher pre-established threshold for sensing finger contact. If the touch-pad 20 is operating with the lower pre-established threshold for sensing finger contact when the concurrent contacts occur which persist throughout the pre-established time-interval, then the touch-pad 20 establishes the higher pre-established threshold for sensing finger contact. Conversely, if the touch-pad 20 is operating with the higher pre-established threshold for sensing finger contact when the concurrent contacts occur which persist throughout the pre-established time-interval, then the touch-pad 20 establishes the lower pre-established threshold for sensing finger contact in response to the concurrent first finger contact 304 and second finger contact 318.

A first finger contact 304 in the upper right-hand corner 308 concurrent with a second finger contact 324 in a pre-established specific location 326 of the active area 22 which persist for the pre-established time-interval activates or deactivates all the special operating modes of the touch-pad 20. Specifically, if the touch-pad 20 is operating in a mode in which it does not respond to concurrent contacts within another pair of pre-established specific locations for a pre-established time-interval, then the touch-pad 20 activates an operating mode in which it responds to contacts with other pairs of pre-established specific locations for the pre-established time-interval, in addition to concurrent finger contacts with the upper right-hand corner 308 and with the immediately adjacent pre-established specific location 326. Conversely, if the touch-pad 20 is operating in a mode in which it responds to concurrent contacts within another pair of pre-established specific locations for a pre-established time-interval, then the touch-pad 20 deactivates that operating mode after sensing concurrent contacts with the upper right-hand corner 308 and with the immediately adjacent pre-established specific location 326.

In addition to sensing and responding to multi-finger contacts to the active area 22, the touch-pad 20 also senses both a direction and a velocity at which a finger contact moves across the active area 22. If the velocity at which a contact moves across the active area 22 exceeds a pre-established threshold of at least 1 inch per second, and preferably 5 inches per second, then the touch-pad 20 transmits data to the computer 42 which causes a cursor to continue moving across the display screen 44 in a direction fixed by an initial direction of contact movement across the active area 22. Moreover, as long as finger contact with the active area 22 persists, the touch-pad 20 continues transmitting data which causes the cursor to continue moving even if such contact with the active area 22 subsequently slows down or becomes stationary.

Similarly, if the computer program executed by the microprocessor 218 senses that finger contact pressure with the active area 22 exceeds a pre-established threshold while moving across the active area 22, then, similar to sensing a finger contact motion in excess of a pre-established threshold velocity, the touch-pad 20 also transmits data to the computer 42 which causes a cursor to continue moving across the display screen 44 in a direction fixed by an initial direction of contact movement across the active area 22. Moreover, as long as finger contact with the active area 22 persists, the touch-pad 20 continues transmitting data which causes the cursor to continue moving even if such contact with the active area 22 subsequently slows down or becomes stationary.

Computer Program

Set forth below is a listing of a copyrighted computer program executed by the microprocessor 218 in controlling the operation of the touch-pad 20. The copyright owner hereby grant others a right to reproduce copies of the patent document including the computer program or of the patent disclosure exactly as it appears in the files of the United States Patent and Trademark Office, but otherwise reserve all copyright rights whatsoever.

DOCKET NO. 2067

```
$TITLE(O2 Micro Touch Pad 8051 Program)
$Date(10/26/1995)

**************************************************************************
*                    Copyrignt 1995 O2 Micro, Inc                         *
*                    All world rights reserved                            *
**************************************************************************

**************************************************************************
*                    Touch Pad Data declarations                          *
**************************************************************************

;=========== X SCAN LINE ORIGINAL VALUE (WITHOUT TOUCHING) ==============
X0              DATA    10H             ; X Line Globol Buffer
X1              DATA    11H
X2              DATA    12H
X3              DATA    13H
X4              DATA    14H
X5              DATA    15H
X6              DATA    16H
X7              DATA    17H
X8              DATA    18H
X9              DATA    19H
XA              DATA    1AH
XB              DATA    1BH
XC              DATA    1CH
XD              DATA    1DH ;=========== Y SCAN LINE ORIGINAL VALUE (WITHOUT TOUCHING) ==============
Y0              DATA    30H             ; Y Line Golbol Buffer
Y1              DATA    31H
Y2              DATA    32H
Y3              DATA    33H
Y4              DATA    34H
Y5              DATA    35H
Y6              DATA    36H
Y7              DATA    37H
Y8              DATA    38H
Y9              DATA    39H ;======================= BIT ADDRESSIBLE DATA AREA =====================
BUFFER          DATA    20H             ; TEMP BUFFER
TEMP            DATA    21H             ; TEMP BUFFER
VALUE           DATA    22H             ; VALUE FOR CHECH POINT COMPARASION

;================== GENERAL PURPOSE DATA BUFFER AREA ===================

;================ COMBYTES
comByte1        DATA    23H
comByte2        DATA    24H
comByte3        DATA    25H ;===== Process counters =====
cScan           DATA    26H             ; ScanLoop counter
cMouseStill     DATA    27H             ; MouseStill counter
cMouseTrail     DATA    28H             ; MouseTrail counter
cMouseDown      DATA    29H             ; MouseDown counter
cTapDown        DATA    2AH             ; TapDown counter

******************************************************************
COM_CHECK                       DATA    2BH         ;FLAG FOR COMMAND TOUCK
COM_SPEED                       BIT     COM_CHECK.0 ;FLAG FOR FINGER SPEED MODE
COM_ORIENTATION                 BIT     COM_CHECK.1 ;FLAG FOR ORIENTATION MODE
COM_SENSITIVITY                 BIT     COM_CHECK.2 ;FLAG FOR SENSITIVITY MODE
```

- 34 -

DOCKET NO. 2067

```
COM_MASTER              BIT     COM_CHECK.3     ;FLAG FOR MASTER TAPPING CONTROL MODE
CHECK_FLAG_SPEED        BIT     COM_CHECK.4     ;FLAG FOR CHECK SPEED
CHECK_FLAG_ORIENTATION  BIT     COM_CHECK.5     ;FLAG FOR CHECK ORIENTATION
CHECK_FLAG_SENSITIVITY  BIT     COM_CHECK.6     ;FLAG FOR CHECK SENSENTIVITY
CHECK_FLAG_MASTER       BIT     COM_CHECK.7     ;FLAG FOR CHECK MASTER
COM_TIME                DATA    4EH

;===== Mouse status flags =====
fMouseStatus    DATA    2CH             ; MouseStatus
bMouseDown      BIT     fMouseStatus.0  ; MouseDown flag
bMouseMove      BIT     fMouseStatus.1  ; MouseMove flag, for Tapping
bMouseEdge      BIT     fMouseStatus.2  ; MouseEdge flag, for DynamicEdge ;===== Button status flags =====
fBtnStatus      DATA    2DH             ; ButtonStatus
bTapDown        BIT     fBtnStatus.0    ; TapDown
bLBtnDown       BIT     fBtnStatus.1    ; LBtnDown
bRBtnDown       BIT     fBtnStatus.2    ; RBtnDown ;===== Command status flags =====
fCmdStatus           DATA    2EH            ; CommandStatus
DRAG_FLAG            BIT     fCmdStatus.0   ; Flag for drag
SUSPEND_FLAG         BIT     fCmdStatus.1   ; Flag for suspend
CHECK_SUSPEND_FLAG   BIT     fCmdStatus.3   ; Flag for suspend check
HAND_CLEAR           BIT     fCmdStatus.4
TIME_FLAG            BIT     fCmdStatus.5

;===== X and Y position variables =====
XX      DATA    60H     ; Current X
PX      DATA    61H     ; Previous X
DX      DATA    62H     ; XX-PX
MX      DATA    63H     ; Movement X
YY      DATA    64H     ; Current Y
PY      DATA    65H     ; Previous Y
DY      DATA    66H     ; YY-PY
MY      DATA    67H     ; Movement Y ;================= BUFFER FOR 24 BITS * 16 BITS SCAN LINES ===============
XBYTE0          DATA    5AH
XBYTE1          DATA    5BH
XBYTE2          DATA    5CH YBYTE0          DATA    5DH
YBYTE1          DATA    5EH
YBYTE2          DATA    5FH ;=========================== X SCAN LINE BUFFER ===========================
X_0     DATA    40H
X_1     DATA    41H
X_2     DATA    42H
X_3     DATA    43H
X_4     DATA    44H
X_5     DATA    45H
X_6     DATA    46H
X_7     DATA    47H
X_8     DATA    48H
X_9     DATA    49H
X_A     DATA    4AH
X_B     DATA    4BH
X_C     DATA    4CH
X_D     DATA    4DH ;=========================== Y SCAN LINE BUFFER ===========================
Y_0     DATA    50H
```

- 35 -

DOCKET NO. 2067

```
Y_1             DATA    51H
Y_2             DATA    52H
Y_3             DATA    53H
Y_4             DATA    54H
Y_5             DATA    55H
Y_6             DATA    56H
Y_7             DATA    57H
Y_8             DATA    58H
Y_9             DATA    59H

************************************************************************
*                   The Touch Pad area start here                      *
************************************************************************
SCAN_CSX        EQU     02000H          ; SCAN X LINE Chip Select
SCAN_CSY        EQU     04000H          ; SCAN Y LINE Chip Select
COUNTER_CS      EQU     06000H          ; COUNTER REGISTER Chip Select
PIO_CS          EQU     08000H          ; POI REGISTER CHIP SELECT
TEST_CS         EQU     0A000H          ; DISPLAY Chip Select
RESET_CS        EQU     0C000H          ; RESET COUNTER Chip Select
BUTTON_CS       EQU     0E000H          ; BUTTON RESET CHIP SELECT START_RS232     EQU     23H             ; START ADDRESS FOR RS232 PACKET
END_RS232       EQU     26H             ; END ADDRESS FOR RS232 PACKET
TH0_DATA        EQU     0F5H            ; HIGH BYTE VALUE FOR TIMER 0
TL0_DATA        EQU     0F0H            ; LOW BYTE VALUE FOR TIMER 0

CLK_DELAY       EQU     0FH             ; DELAY VALUE FOR SCAN LINE X & Y

LAST_SCAN_X     EQU     0EH             ; LAST X SCAN LINE
LAST_SCAN_Y     EQU     1AH             ; LAST Y SCAN LINE
END_SCAN_X      EQU     0DH             ; END X SCAN LINE
END_SCAN_Y      EQU     19H             ; END Y SCAN LINE

*----------------------------------------------------------------------*
* Port 1, bit 0 - Scan X Driver                                        *
* Port 1, bit 1 - Scan Y Driver                                        *
* Port 1, bit 2 - Left Button Input Port                               *
* Port 1, bit 3 - Right Button Input Port                              *
* Port 1, bit 4 - PS/2 Clock Input From PS/2 Host                      *
* Port 1, bit 5 - PS/2 Data Input From PS/2 Host                       *
* Port 1, bit 6 - PS/2 Clock Output to PS/2 Host                       *
* Port 1, bit 7 - PS/2 Data Output to PS/2 Host                        *
*----------------------------------------------------------------------*

************************************************************************
*                         START OF CODE                                *
************************************************************************
        ORG     0H                      ; RESET vector
        AJMP    START                   ; now over here ORG     03H                     ; Interrupt 0 vector
        AJMP    MS_MOUSE_FOUND          ; RETURN 'M' FOR MS-MOUSE ORG     0BH                     ; Timer 0 interrupt for pad timer
        AJMP    TIMER0_INTR ORG     13H                     ; Interrupt 1 For Button Press
        AJMP    BtnIntr ORG     1BH                     ; Timer 1 interrupt vector
        RETI ORG     23H                     ; RS232 interrupt vector
```

- 36 -

DOCKET NO. 2067

```
        RETI
        ORG     100H
;*********************************************************************
START:
        MOV     SP,#68H                 ; Set stack start address
        MOV     P1,#3CH                 ; Set P1 as output register
        SETB    P1.0                    ; For X Scan Line
        SETB    P1.1                    ; For Y Scan Line
        SETB    P1.2                    ; For right push button detect line
        SETB    P1.3                    ; For left push button detect line
;===== SET RS-232 BAUD RATE BY SETTING TIMER 1 AS BAUD RATE GENERATOR =====

MOV     IE,#85H                 ;ENABLE TIMER 0 INTERRUPT
        MOV     IP,#04H                 ;SET INTR 1 AS HIGH PRIORITY INTR.
        ORL     TCON,#55H               ;ENABLE TIMER 0 & INTR 0
        MOV     TMOD,#25H               ;SET TIMER 1 AS MODE 2 TIMER 0 MODE 1
        ANL     PCON,#7FH               ;SET SMOD=1 AS DOUBLE BAUD RATE
        ORL     SCON,#40H               ;SET SERIAL PORT AS MODE 1
        MOV     TH1,#0E8H               ;SET TIMER1 AS 1200 BAUD RATE

;============= SETUP VALUE FOR TIMER 0 INTERRUPT SUBROUTINE =============

MOV     TH0,#TH0_DATA           ; Timer0 initial byte1
        MOV     TL0,#TL0_DATA           ; Timer0 initial byte2

MOV     X0,#00000001B
        MOV     X1,#00000010B
        MOV     X2,#00000100B
        MOV     X3,#00001000B
        MOV     X4,#00010000B
        MOV     X5,#00100000B
        MOV     X6,#01000000B
        MOV     X7,#10000000B

MOV     X8,#00000001B
        MOV     X9,#00000010B
        MOV     XA,#00000100B
        MOV     XB,#00001000B
        MOV     XC,#00010000B
        MOV     XD,#00100000B

MOV     Y0,#00000001B
        MOV     Y1,#00000010B
        MOV     Y2,#00000100B
        MOV     Y3,#00001000B
        MOV     Y4,#00010000B
        MOV     Y5,#00100000B
        MOV     Y6,#01000000B
        MOV     Y7,#10000000B

MOV     Y8,#00000001B
        MOV     Y9,#00000010B

; Reset GreenPad

MOV     COM_CHECK,#00H          ; SET UP FINGER SPEED HIGH,REGULAR X-Y
        MOV     COM_TIME,#00H           ; COMMAND TIMER
        ACALL   ResetGreenPad
;*********************************************************************
*                       MAIN PROGRAM LOOP                            *
;*********************************************************************
```

- 37 -

DOCKET NO. 2067

```
L_SCANLOOP:

INC     cScan
    MOV     A,cScan

MOV     R5,#060H                        ; Delay256
    ACALL   DelayX

MOV     XBYTE0,#0FFH
    MOV     XBYTE1,#03FH
    MOV     YBYTE0,#0FFH
    MOV     YBYTE1,#03H

ACALL   ChkBtnState                     ; Check Button State

ACALL   SCAN_X                          ; X SCAN LINE
    ACALL   SCAN_Y                          ; Y SCAN LINE

;*******************************
    ACALL   COMMAND
;*******************************

ACALL   GetX
    JZ      L_MOUSEUP
    ACALL   GetY
    JZ      L_MOUSEUP

JNB     bMouseDown,L_MOUSEDOWN          ; Process MouseDown

ACALL   GetDXY
    CLR     A
    CJNE    A,DX,L_MOUSEMOVED
    CJNE    A,DY,L_MOUSEMOVED

L_MOUSESTILL:
    ACALL   MouseStill                      ; Mouse is stationary
    JMP     L_SCANLOOP L_MOUSEMOVED:
    ACALL   MouseMove                       ; Mouse moved
    JMP     L_SCANLOOP L_MOUSEDOWN:
    ACALL   MouseDown                       ; MouseDown the first time
    JMP     L_SCANLOOP L_MOUSEUP:
    ACALL   MouseUp                         ; MouseUp
    JMP     L_SCANLOOP ;***************************************************************
; Module         COMMAND
; Description    Command decoder that decode input bit pattern
;                (24 bits) into command.
; Input          Xbyte2, Xbyte1, Xbyte0,
;                Ybyte2, Ybyte1, Ybyte0
; Output         A, Command code
;
;***************************************************************
COMMAND:
    MOV     BUFFER,A
    MOV     TEMP,R1                 ;SAVE A,R1
    JB      TIME_FLAG,CHE_HAN_OF
```

```
        ACALL    ONPAD_COMMAND
        JNB      TIME_FLAG,NECK
CHE_HAN_OF:
        ACALL    HAND_TAKE_OFF
        JC       END_HA_OF
        CLR      TIME_FLAG
NECK:
        ACALL    DRAG_LOCK_COMMAND       ;CHECK DRAG LOCK COMMAND
END_HA_OF:
        MOV      A,BUFFER                ;SAVE A
        MOV      R1,TEMP
        RET
***********************************************************************
*   CHECK AFTER COMMAND HAND SHOULD TAKE OFF,THEN FINISH COMMAND       *
***********************************************************************
HAND_TAKE_OFF:
        CLR      C
        MOV      A,XBYTE0
        ANL      A,#66H
        JZ       END_HAND_TOF1
        SETB     C
        AJMP     END_HAND_TOF
END_HAND_TOF1:
        MOV      A,XBYTE1
        ANL      A,#66H
        JZ       END_HAND_TOF
        SETB     C
END_HAND_TOF:
        RET
***********************************************************************
*   CHECK COMMAND MODE,SET FLAG FOR WHICH MODE                         *
***********************************************************************
ONPAD_COMMAND:
        MOV      A,XBYTE2                ;CHECK XBYTE2 IS TOUCH
        ANL      A,#60H                  ;CHECK X-CONTROL IS TOUCH
        JZ       END_COMMAND             ;X_CONTROL IS TOUCH
        MOV      A,YBYTE0                ;CHECK YBYTE0 IS TOUCH
        ANL      A,#06H
        JZ       END_COMMAND             ;CHECK Y-CONTROL IS TOUCH
        MOV      A,COM_CHECK
        ANL      A,#0FH                  ;CLEAR FLAG COMMAND
        MOV      COM_CHECK,A             ;SAVE COM_CHECK STATUS
        ACALL    CHECK_COMMAND           ;CHECK ANY COMMAND GIVEN
        JNC      END_COMMAND             ;IF NO TOUCH GO END,IF TOUCH CONTINUOU
        ACALL    CHECK_OTHER_TOUCH       ;CHECK OTHER LINE HAVE TOUCH
        JC       END_COMMAND             ;IF OTHER LINE TOUCH SO NO COMMAND
        INC      COM_TIME                ;TOUCH SO CHECK TIME
        MOV      A,COM_TIME
        CJNE     A,#08H,END_COMMAND      ;TOUCH IS ONE SECOND
        SETB     TIME_FLAG
        JNB      CHECK_FLAG_SPEED,CHECK1 ;CHECK IS SPEED MODE
***********************************************************************
*       TOGGLE FLAG FOR FINGER SPEED MODE                              *
***********************************************************************
        CPL      COM_SPEED               ;TOGGLE SPEED MODE
                                         ;CALL COMMAND_SPEED_MODE
        AJMP     CHECK4
CHECK1:
***********************************************************************
*       TOGGLE FLAG FOR ORIENTATION MODE                               *
***********************************************************************
        JNB      CHECK_FLAG_ORIENTATION,CHECK2   ;CHECK ORIENTATION MODE
        CPL      COM_ORIENTATION         ;TOGGLE ORIENTATION MODE
                                         ;CALL COMMAND_ORIENTATION_MODE
```

- 39 -

DOCKET NO. 2067

```
        AJMP    CHECK4
CHECK2:
************************************************************************
*       TOGGLE FLAG FOR SENSITIVITY MODE                                *
************************************************************************
        JNB     CHECK_FLAG_SENSITIVITY,CHECK3   ;CHECK IS SENSITIVITY MODE
        CPL     COM_SENSITIVITY         ;TOGGLE SENSITIVITY MODE
                                        ;CALL COMMAND_SENSITIVITY_MODE
        AJMP    CHECK4
CHECK3:
************************************************************************
*       TOGGLE FLAG FOR MASTER MODE                                     *
************************************************************************
        JNB     CHECK_FLAG_MASTER,CHECK4 ;CHECK IS MASTER MODE
        CPL     COM_MASTER              ;TOGGLE MASTER MODE
                                        ;CALL COMMAND_MASTER
CHECK4:
        MOV     COM_TIME,#00H           ;RESET TIME
END_COMMAND:
        RET
************************************************************************
*    CHECK FOUR MODE OF COMMAND,SET FLAG FOR THE FOUR                   *
************************************************************************
CHECK_COMMAND:
        CLR     C
        MOV     A,XBYTE0                ;CHECK XBYTE0 ORDER ANY TOUCH
        ANL     A,#66H
        JZ      CHECK_SENSITIVITY       ;XBYTE0 NO TOUCH,CHECK XBYTE1
        MOV     A,XBYTE0                ;CHECK XBYTE0 LOW ORDER ANY TOUCH
        ANL     A,#06H
        JZ      CHECK_ORIENTATION ;     ;CHECK SPEED MODE
        MOV     A,XBYTE1                ;CHECK XBYTE1 ANY TOUCH
        ANL     A,#66H
        JNZ     END_COMMAND_CHECK
        SETB    CHECK_FLAG_SPEED
        AJMP    END_CHECK

CHECK_ORIENTATION:
        MOV     A,XBYTE1
        ANL     A,#66H
        JNZ     END_COMMAND_CHECK
        SETB    CHECK_FLAG_ORIENTATION  ;FLAG FOR ORIENTATION
        AJMP    END_CHECK

CHECK_SENSITIVITY:
        MOV     A,XBYTE1
        ANL     A,#66H
        JZ      END_COMMAND_CHECK       ;CHECK FOR SENTIVITY
        MOV     A,XBYTE1
        ANL     A,#06H
        JZ      CHECK_MASTER
        MOV     A,XBYTE1
        ANL     A,#60H
        JNZ     END_COMMAND_CHECK
        SETB    CHECK_FLAG_SENSITIVITY  ;FLAG FOR SENSITIVITY
        AJMP    END_CHECK

CHECK_MASTER:
        SETB    CHECK_FLAG_MASTER       ;FLAG FOR MASTER
END_CHECK:
        SETB    C
END_COMMAND_CHECK:
        RET
************************************************************************
```

- 40 -

DOCKET NO. 2067

```
*       CHECK OTHER THAN COMMAND,HAVE ANY OTHER TOUCH              *
****************************************************************
CHECK_OTHER_TOUCH:
        CLR     C
        MOV     A,YBYTE0                ;CHECK YBYTE0 HIGH-ORDER ANY TOUCH
        ANL     A,#60H
        JZ      CHECK_YBYTE1
        AJMP    END_TOUCH
CHECK_YBYTE1:
        MOV     A,YBYTE1                ;CHECK YBYTE1 ANY TOUCH
        ANL     A,#66H
        JZ      CHECK_YBYTE2
        AJMP    END_TOUCH
CHECK_YBYTE2:
        MOV     A,YBYTE2                ;CHECK YBYTE2 ANY TOUCH
        ANL     A,#03H
        JZ      CHECK_XBYTE2
        AJMP    END_TOUCH
CHECK_XBYTE2:                           ;CHECK XBYTE2 HAVE ANY TOUCH
        MOV     A,XBYTE2
        ANL     A,#06H
        JZ      END_OTHER_TOUCH
END_TOUCH:
        SETB    C                       ;IF TOUCH,C=1
END_OTHER_TOUCH:
        RET
****************************************************************
*   ONE-PAD NOTEBOOK COMPUTER SUSPEND MODE BUTTON AND TOUCH-ON-WAKEUP   *
****************************************************************
DRAG_LOCK_COMMAND:
        ACALL   DRAG_LOCK_DETECTION     ;CHECK DRAG OR SUSPEND MODE
        JNB     DRAG_FLAG,END_DET_DRAG
        JB      HAND_CLEAR,CE1
        ACALL   HAND_STILL_ON           ;CHECK HAND MOVE OR DRAG HAND STILL
        JNC     END_DET_DRAG            ;IF HAND STILL ON,END
CE1:
        ACALL   DRAG_LOCK_MOVE
        JNC     END_DET_DRAG
        ACALL   RETOUCH_DRAG            ;RETOUCH DRAG MODE AGAIN
        JNC     END_DET_DRAG
        CLR     HAND_CLEAR
        CLR     DRAG_FLAG
END_DET_DRAG:
        RET
****************************************************************
*   CHECK DARG COMMAND HAVE ANY TOUCH IF TOUCH COMMAND FLAG C=1        *
****************************************************************
RETOUCH_DRAG:
        ACALL   DETECT_Y2               ;CHECK YBYTE1 HIGH &YBYTE2 LOW ANY TOUCH
        JNC     END_RETOUCH             ;NO TOUCH,GO END
        CLR     C
        MOV     A,XBYTE0                ;CHECK XBYTE
        ANL     A,#06H
        JZ      CHECK_OTHER_X2          ;CHECK XBYTE0 HAVE TOUCH
        SETB    C
        AJMP    END_RETOUCH
CHECK_OTHER_X2:
        MOV     A,XBYTE2
        ANL     A,#60H
        JZ      END_RETOUCH             ;CHECK XBYTE2 HAVE TOUCH
        SETB    C
END_RETOUCH:
        RET
****************************************************************
```

- 41 -

DOCKET NO. 2067

```
*    CHECK HAND STILL TOUCH COMMAND DRAG IF NO TOUCH C=1 & HAND_CLEAR=1   *
*******************************************************************************
HAND_STILL_ON:
        ACALL   DETECT_Y2               ;DETECT Y2 ANY TOUCH
        JC      CHECK_X_STILL           ;Y2 IF TOUCH C=1,GOTO CHECK X
        SETB    HAND_CLEAR              ;NO TOUCH,SET CLEAR FLAG
        SETB    C                       ;SET COMMON FLAG FOR FLAG
        AJMP    END_HAND_STILL
CHECK_X_STILL:
        CLR     C                       ;CHECK XBYTE0 HAVE TOOUCH
        MOV     A,XBYTE0
        ANL     A,#06H
        JNZ     END_HAND_STILL          ;XBYTE0 NO TOUCH CONTINUOUS CHECK
        MOV     A,XBYTE2                ;XBYTE2 ANY TOUCH
        ANL     A,#60H
        JNZ     END_HAND_STILL
        SETB    HAND_CLEAR              ;NO TOUCH SET FLAG FOR HAND_CLEAR
        SETB    C                       ;SET COMMON FLAG FOR FLAG
END_HAND_STILL:
        RET
*******************************************************************************
*    CHECK DRAG OR DRAG FLAG,IF SUSPEND & TIME IS ONE SECOND,SUSPEND    *
*******************************************************************************
DRAG_LOCK_DETECTION:
        ACALL   DETECT_Y2
        JNC     END_DRAG_LOCK
        ACALL   CHECK_STATUS_X          ;CHECK ANY SET FLAG
        JNC     END_DRAG_LOCK           ;NO SET FLAG
        JNB     DRAG_FLAG,CHECK_SUSPEND ;SET,CHECK WHICH ONE
        SETB    C
        AJMP    END_DRAG_LOCK
CHECK_SUSPEND:                          ;CHECK SUSPEND MODE
        ACALL   DRAG_LOCK_MOVE          ;CHECK OTHER TOUCH
        JC      END_DRAG_LOCK
        INC     COM_TIME                ;CHECK TIME IS ONE SECOND
        MOV     A,COM_TIME
        CJNE    A,#08OH,END_DRAG_LOCK   ;CHECK TIME IS ONE MINTUE
        CPL     SUSPEND_FLAG            ;TOGGLE SUSPEND MODE
        MOV     COM_TIME,#00            ;CLEAR TIME
        SETB    C
        CLR     CHECK_SUSPEND_FLAG
END_DRAG_LOCK:
        RET
*******************************************************************************
*    CHECK YBYTE2 & YBYTE1 HIGH BYTE HAVE ANY TOUCH IF TOUCH C=1    *
*******************************************************************************
DETECT_Y2:
        CLR     C
        MOV     A,YBYTE2
        ANL     A,#03H
        MOV     B,A                     ;IF TOUCH SAVE VALUE
        MOV     A,YBYTE1                ;TAKE TWO BIT OF YBYTE1 TO CHECK
        SWAP    A                       ;EXCHANG YBYTE1
        ANL     A,#0CH
        ORL     A,B
        ANL     A,#06H
        JZ      END_DETECT_Y2
        SETB    C
END_DETECT_Y2:                          ;high y1 & low y2 has touch,c=1
        RET
*******************************************************************************
*    CHECK X BYTE SUSPEND OR DRAG MODE SET FLAG FOR THEM IF MODE C=1    *
*******************************************************************************
CHECK_STATUS_X:                         ;CHECK SUSPEND OR DRAG MODE
```

- 42 -

DOCKET NO. 2067

```
            CLR     C
            MOV     A,XBYTE0
            ANL     A,#06H
            JZ      CHECK_OTHER             ;CHECK XBYTE0 HAVE TOUCH
            ACALL   DELAY2
            MOV     A,XBYTE2
            ANL     A,#60H
            JZ      SET_FLAG_DRAG_MODE      ;CHECK XBYTE2 HAVE TOUCH
            SETB    C                       ;SET COMMON FLAG C=1
            SETB    CHECK_SUSPEND_FLAG      ;SET CHECK SUSPEND
            AJMP    END_CHECK_DRAG
CHECK_OTHER:
            MOV     A,XBYTE2
            ANL     A,#60H
            JZ      END_CHECK_DRAG          ;CHECK XBYTE2 HAVE TOUCH
            ACALL   DELAY2
            MOV     A,XBYTE0
            ANL     A,#06H
            JZ      SET_FLAG_DRAG_MODE      ;CHECK XBYTE0 HAVE TOUCH
            SETB    CHECK_SUSPEND_FLAG
            SETB    C
            AJMP    END_CHECK_DRAG
SET_FLAG_DRAG_MODE:                         ;TO CHECK IT IS DRAG MODE
            ACALL   DRAG_LOCK_MOVE          ;CHECK ANOTHER HAND TOUCH
            JNC     END_CHECK_DRAG          ;IF TWO HAND TOUCH,DRAG MODE
            SETB    DRAG_FLAG               ;SET DRAG_FLAG
            SETB    C                       ;SET COMMOM FLAG C=1
END_CHECK_DRAG:
            RET

*****************************************************************
*       CHECK ANOTHER HAND TOUCH PAD IF TOUCH C=1                *
*****************************************************************
DRAG_LOCK_MOVE:                             ;CHECK ANY TOUCH
            CLR     C
            MOV     A,YBYTE0                ;CHECK YBYTE0 ANY TOUCH
            JZ      NEXT_Y1_CHECK
            SETB    C                       ;YBYTE0 HAS TOUCH
            AJMP    END_DRAG_MODE
NEXT_Y1_CHECK:
            MOV     A,YBYTE1                ;CHECK YBYTE1 ANY TOUCH
            ANL     A,#1FH
            JZ      NEXT_X0_CHECK
            SETB    C                       ;YBYTE1 HAS TOUCH
            AJMP    END_DRAG_MODE
NEXT_X0_CHECK:
            MOV     A,XBYTE0                ;CHECK XBYTE0 HIGH BYTE HAVE TOUCH
            ANL     A,#0E0H
            JZ      NEXT_X1_CHECK
            SETB    C                       ;SET FOR XBYTE0 HIGH TOUCH
            AJMP    END_DRAG_MODE
NEXT_X1_CHECK:
            MOV     A,XBYTE1                ;CHECK XBYTE1 HAVE TOUCH
            JZ      NEXT_X2_CHECK
            SETB    C                       ;SET XBYTE1 HAVE TOUCH
            AJMP    END_DRAG_MODE
NEXT_X2_CHECK:                              ;CHECK XBYTE2 LOW BYTE HAVE TOUCH
            MOV     A,XBYTE2
            ANL     A,#07H
            JZ      END_DRAG_MODE
            SETB    C                       ;SET FLAG FOR XBYTE2 HAVE TOUCH
END_DRAG_MODE:
            RET
```

- 43 -

DOCKET NO. 2067

```
************************************************************************

************************************************************************
*                 SCAN X LINE ROUTINE (FORM X0 TO X7)                   *
************************************************************************
SCAN_X:
        MOV     A,#00H
XLOOP:
        MOV     DPTR,#SCAN_CSX
        MOVX    @DPTR,A

MOV     DPTR,#RESET_CS
        MOVX    @DPTR,A

ACALL   TEN_US
        ACALL   TEN_US

CLR     P1.0
        MOV     R3,#00H
C1:                                             ;DELAY TIME FOR SCAN X
        INC     R3
        CJNE    R3,#01AH,C1                     ;#CLK_DELAY,C1
        SETB    P1.0
        NOP
        NOP

MOV     BUFFER,A
        MOV     A,0FFH
        MOV     DPTR,#SCAN_CSX
        MOVX    @DPTR,A
        MOV     A,BUFFER

ACALL   X_COUNTER
        INC     A
        CJNE    A,#LAST_SCAN_X,XLOOP
        RET

****** END OF SCAN_X ******

************************************************************************
*                 SCAN Y LINE ROUTINE (FORM X0 TO X7)                   *
************************************************************************
SCAN_Y:
        MOV     A,#010H

YLOOP:
        MOV     DPTR,#SCAN_CSY
        MOVX    @DPTR,A
        MOV     DPTR,#RESET_CS
        MOVX    @DPTR,A

ACALL   TEN_US
        ACALL   TEN_US

CLR     P1.1
        MOV     R3,#00H
C2:
        INC     R3
        CJNE    R3,#01AH,C2                     ;#CLK_DELAY,C2
        SETB    P1.1
        NOP
        NOP
        MOV     BUFFER,A
```

- 44 -

DOCKET NO. 2067

```
        MOV     A,0FFH
        MOV     DPTR,#SCAN_CSY
        MOVX    @DPTR,A
        MOV     A,BUFFER

ACALL   Y_COUNTER
        INC     A
        CJNE    A,#LAST_SCAN_Y,YLOOP
        RET

****** END OF Y SCAN LINE ******
;****************************************************************
; Module        ResetGreenPad
; Description   Reset control variables
;****************************************************************

ResetGreenPad:

MOV     XBYTE2,#00H             ; Reset XBYTES
        MOV     XBYTE1,#03FH
        MOV     XBYTE0,#0FFH
        MOV     YBYTE2,#00H             ; Reset YBYTES
        MOV     YBYTE1,#03H
        MOV     YBYTE0,#0FFH MOV     fMouseStatus,#00H       ; Reset MouseStatus
        MOV     fBtnStatus,#00H         ; Reset ButtonStatus
        MOV     comByte1,#11000000B     ; Reset ComByte1
        MOV     comByte2,#10000000B     ; Reset ComByte2
        MOV     comByte3,#10000000B     ; Reset ComByte3

MOV     MX,#00H
        MOV     MY,#00H

MOV     cScan,#00H              ; Reset ScanLoop counter
        MOV     cMouseStill,#00H        ; Reset MouseStill counter
        MOV     cMouseTrail,#00H        ; Reset MouseTrail counter
        MOV     cMouseDown,#00H         ; Reset MouseDown counter

RET

;****************************************************************
; Module        SendComBytes
; Description   Send com bytes to port
; Input         comByte1, comByte2, comByte3
;****************************************************************

SendComBytes:

MOV     R0,#comByte1            ; Load address of comBytes

CLR     SCON.1                  ; Send comByte1
        MOV     SBUF,@R0
        SETB    P3.1
        JNB     SCON.1,$ INC     R0                      ; Increment address
        CLR     SCON.1                  ; Send comByte2
        MOV     SBUF,@R0
        SETB    P3.1
        JNB     SCON.1,$ INC     R0                      ; Increment address
```

- 45 -

DOCKET NO. 2067

```
        CLR     SCON.1                  ; Send comByte3
        MOV     SBUF,@R0
        SETB    P3.1
        JNB     SCON.1,$ CLR     SCON.1                  ; Cleanup
        RET ;****************************************************************
; Module        GetComBytes
; Description   Get comBytes from mouse movement
;                 with no Btn information
; Input         (MX,MY)
; Output        comByte1, comByte2, comByte3
;****************************************************************
GetComBytes:

ANL     comByte1,#11110000B     ; Clear X,Y
        ANL     comByte2,#10000000B     ;
        ANL     comByte3,#10000000B     ;

MOV     A,MX                    ; Store X5-X0
        ANL     A,#00111111B            ;
        ORL     comByte2,A              ;
        MOV     A,MX                    ; Store X7-X6
        RL      A                       ;
        RL      A                       ;
        ANL     A,#00000011B            ;
        ORL     comByte1,A              ;

MOV     A,MY                    ; Store Y5-Y0
        ANL     A,#00111111B            ;
        ORL     comByte3,A              ;
        MOV     A,MY                    ; Store Y7-Y6
        RL      A                       ;
        RL      A                       ;
        RL      A                       ;
        RL      A                       ;
        ANL     A,#00001100B            ;
        ORL     comByte1,A              ;

RET

;****************************************************************
; Module        SendMouseMove
; Description   Send mouse movement
; Input         (MX,MY)
;****************************************************************
SendMouseMove:

ACALL   GetComBytes             ; Get comBytes from (MX,MY)
        ACALL   SendComBytes            ; Send comBytes

RET

;****************************************************************
; Module        MouseMove
; Description   Process MouseMove message
; Input         (DX,DY)
;****************************************************************
MouseMove:

MOV     A,DX
        ACALL   GetMove                 ; Determine MX
```

- 46 -

DOCKET NO. 2067

```
        MOV     MX,A
        MOV     A,DY
        ACALL   GetMove             ; Determine MY
        MOV     MY,A ACALL   SendMouseMove       ; Send MouseMove to port
        MOV     PX,XX               ; Store XX as PX
        MOV     PY,YY               ; Store YY as PY MOV     A,cMouseStill
        ANL     A,#00FH             ; Add at most 15 trailers
        MOV     cMouseTrail,A MOV     cMouseStill,#00H    ; Reset MouseStill counter
        INC     cMouseDown          ; Increment MouseDown counter

RET

;****************************************************************
; Module        MouseStill
; Description   Process when Mouse is stationary
;****************************************************************
MouseStill:

ACALL   MouseTrail
        INC     cMouseStill         ; Increment MouseStill counter
        INC     cMouseDown          ; Increment MouseDown counter
        RET ;****************************************************************
; Module        MouseTrail
; Description   Output MouseTrails
;****************************************************************
MouseTrail:

MOV     A,cMouseTrail       ; Ouptut mouse trailer
        JZ      L_MOUSETRAIL0
        DEC     A
        MOV     cMouseTrail,A
        ACALL   SendMouseMove

L_MOUSETRAIL0:

RET

;****************************************************************
; Module        MouseDown
; Description   Process MouseDown message
; Input         (XX,YY)
; Output        (PX,PY)
;****************************************************************
MouseDown:

SETB    bMouseDown          ; Set MouseDown flag
        MOV     cMouseDown,#00H     ; Reset MouseDown counter
        MOV     PX,XX               ; Store XX as PX
        MOV     PY,YY               ; Store YY as PY
        RET ;****************************************************************
; Module        MouseUp
; Description   Process MouseUp message
;****************************************************************
MouseUp:
```

- 47 -

DOCKET NO. 2067

```
        JB      bMouseDown,L_MOUSEUP2   ; If not MouseDown
        JB      bTapDown,L_MOUSEUP0     ;    If not TapDown
        RET                             ;       Return

L_MOUSEUP0:

INC     cTapDown                ;    If TapDown
        MOV     A,cTapDown              ;       Increment TapDown count
        ANL     A,#0E0H                 ;       If TapDown count <= 32
        JZ      L_MOUSEUP1              ;          Return
        CLR     bTapDown                ;       else
        ACALL   LRBtnUp                 ;          Reset TapDown
                                        ;          Send BtnUp
L_MOUSEUP1:
        RET                             ;       Return

L_MOUSEUP2:

JNB     bTapDown,L_MOUSEUP3     ; If TapDown
        CLR     bTapDown                ;    Reset TapDown
        ACALL   LRBtnUp                 ;    Send BtnUp
        JMP     L_MOUSEUP4

L_MOUSEUP3:
        JB      bMouseMove,L_MOUSEUP4   ; If not bMouseMoved
        ACALL   TapDown                 ;    TapDown

L_MOUSEUP4:

MOV     fMouseStatus,#00H       ; Reset MouseStatus flags
        MOV     cMouseTrail,#00H        ; Reset MouseTrail counter
        MOV     cMouseStill,#00H        ; Reset MouseStill counter
        MOV     cMouseDown,#00H         ; Reset MouseDown counter
        RET ;****************************************************************
; Module        TapDown
; Description   Process TapDown message
;****************************************************************
TapDown:

JB      bLBtnDown,L_TAPDOWN0
        JB      bRBtnDown,L_TAPDOWN0
        ACALL   LBtnDown                ; LBtnDown
        MOV     cTapDown,#00H           ; Reset TapDown counter
        SETB    bTapDown

L_TAPDOWN0:
        RET

;****************************************************************
; Module        GetX
; Description   Get X coordinate
; Input         xByte2, xByte1, xByte0
; Output        XX
;****************************************************************
GetX:

MOV     R2,xByte2
        MOV     R1,xByte1
        MOV     R0,xByte0
        ACALL   PosDecoder
        MOV     XX,A
```

- 48 -

```
        RET

;****************************************************************
; Module        GetY
; Description   Get Y coordinate
; Input         yByte2, yByte1, yByte0
; Output        YY
;****************************************************************
GetY:

MOV     R2,yByte2
        MOV     R1,yByte1
        MOV     R0,yByte0
        ACALL   PosDecoder
        MOV     YY,A

RET

;****************************************************************
; Module        GetDXY
; Description   Get mouse movement (DX,DY)
; Input         (XX,YY) (PX,PY)
; Output        (DX,DY)
;****************************************************************
GetDXY:

MOV     A,XX                    ; Load XX
        CLR     C                       ; Clear Carry
        SUBB    A,PX                    ; DX=XX-PX
        JNB     COM_ORIENTATION,L_DX    ; If Orientation
        CPL     A                       ;     A = -A
        INC     A
L_DX:
        MOV     DX,A                    ; Store DX MOV     A,YY                    ; Load YY
        CLR     C                       ; Clear Carry
        SUBB    A,PY                    ; DY=YY-PY
        JNB     COM_ORIENTATION,L_DY    ; If Orientation
        CPL     A                       ;     A = -A
        INC     A
L_DY:
        MOV     DY,A                    ; Store DY

RET

;****************************************************************
; Module        GetMove
; Description   Get mouse movement based on displacement
; Input         A (DX or DY)
; Output        A (MX or MY)
;****************************************************************
GetMove:

JB      ACC.7,L_MOVE0           ; if (A < 0)
        ACALL   GetMoveX
        RET

L_MOVE0:

CPL     A                       ; A = -A
        INC     A
        ACALL   GetMoveX
        CPL     A                       ; A = -A
```

- 49 -

DOCKET NO. 2067

```
        INC     A
        RET

;****************************************************************
; Module        GetMoveX
; Description   Get mouse movement based on displacement
; Input         A (DX or DY) A >= 0
; Output        A (MX or MY)
;****************************************************************
GetMoveX:

MOV     DPTR,#MoveLookup        ; Load movement lookup table
        MOVC    A,@A+DPTR               ; Load movement
        JNB     COM_SPEED,L_GETMX       ; If Speed
        CLR     C                       ;     A = A/2
        RRC     A
L_GETMX:
        ACALL   ChkMouseMove            ; Check MouseMove

RET

;****************************************************************
; Module        ChkMouseMove
; Description   Set MouseMove status based on MouseMovement
; Input         A
;****************************************************************
ChkMouseMove:

CJNE    A,#07FH,L_CHKMOUSEMOVE0 ; If A=0x7F
        SETB    bMouseEdge              ;     Set MouseEdge flag

L_CHKMOUSEMOVE0:

MOV     B,A                     ; Save A
        ANL     A,#0FCH                 ; If A > 3
        JZ      L_CHKMOUSEMOVE1         ;     Set MouseMove flag
        SETB    bMouseMove

L_CHKMOUSEMOVE1:

MOV     A,cMouseDown            ; If cMouseDown > 7
        ANL     A,#0F8H                 ;     Set MouseMove flag
        JZ      L_CHKMOUSEMOVE2
        SETB    bMouseMove L_CHKMOUSEMOVE2:
        XCH     A,B                     ; Restore A

RET

;****************************************************************
; Module        LBtnDown
; Description   Process left button down
;****************************************************************
LBtnDown:

MOV     comByte1,#11100000B
        MOV     comByte2,#10000000B
        MOV     comByte3,#10000000B
        ACALL   SendComBytes
        RET
```

- 50 -

DOCKET NO. 2067

```
;****************************************************************
; Module       RBtnDown
; Description  Process right button down
;****************************************************************
RBtnDown:

MOV      comByte1,#11010000B
    MOV      comByte2,#10000000B
    MOV      comByte3,#10000000B
    ACALL    SendComBytes
    RET ;****************************************************************
; Module       LRBtnUp
; Description  Process button up
;****************************************************************
LRBtnUp:

MOV      comByte1,#11000000B
    MOV      comByte2,#10000000B
    MOV      comByte3,#10000000B
    ACALL    SendComBytes
    RET ;***********************************************************************
; Module       ChkBtnState
; Description  Process button state changes
;***********************************************************************
ChkBtnState:

JNB      P1.2,L_BTNSTATE0           ; Left Button Down
    JNB      P1.3,L_BTNSTATE1           ; Right Button Down
    JMP      L_BTNSTATE2                ; ButtonUp L_BTNSTATE0:
    JB       bLBtnDown,L_BTNSTATE4      ; LBtnDown
    ACALL    LBtnDown
    SETB     bLBtnDown
    CLR      bTapDown
    JMP      L_BTNSTATE4

L_BTNSTATE1:
    JB       bRBtnDown,L_BTNSTATE4      ; RBtnDown
    ACALL    RBtnDown
    SETB     bRBtnDown
    CLR      bTapDown
    JMP      L_BTNSTATE4

L_BTNSTATE2:
    JB       bLBtnDown,L_BTNSTATE3
    JB       bRBtnDown,L_BTNSTATE3
    JMP      L_BTNSTATE4

L_BTNSTATE3:
    ACALL    LRBtnUp                    ; BtnUp
    CLR      bLBtnDown
    CLR      bRBtnDown

L_BTNSTATE4:

RET

****** END OF EXTERNAL INTERRUPT 1 SUBROUTINE ******
```

- 51 -

DOCKET NO. 2067

```
*************************************************************************
*                    TIMER 0 INTERRUPT SUBROUTINE                       *
*************************************************************************
TIMER0_INTR:

CLR     IE.7                    ; Disable Interrupt
    PUSH    PSW                     ; Store Status
    MOV     R7,A                    ; Save A
    MOV     TH0,#TH0_DATA           ; Timer0 Initial value byte1
    MOV     TL0,#TL0_DATA           ; Timer0 Initial value byte0

MOV     A,R7                    ; Restore A
    POP     PSW
    SETB    IE.7

RETI

****** END OF INTERRUPT SUBROUTINE ******

*************************************************************************
*                 CLEAR INTRRUPT 1 SUBROUTINE PROGRAM                   *
*************************************************************************
CLEAR_INTR1:

MOV     A,0FFH
    MOV     DPTR,#BUTTON_CS
    MOVX    @DPTR,A

RET
****** END OF CLEAR EXTERNAL INTERRUPT 1 ******

*************************************************************************
*                 EXTERN INTRRUPT 1 SUBROUTINE PROGRAM                  *
*************************************************************************
BtnIntr:
    CLR     IE.7                    ; Disable Interrupt
    PUSH    PSW                     ; Store Status
    MOV     R7,A                    ; Save A

ACALL   CLEAR_INTR1

MOV     A,R7                    ; Restore A
    POP     PSW
    SETB    IE.7
    RETI

****** END OF EXTERNAL INTERRUPT 1 SUBROUTINE ******

*************************************************************************
*              RETURN 'M' FOR MICROSOFT MOUSE INITIALIZATION            *
*************************************************************************

MS_MOUSE_FOUND:

PUSH    ACC
    PUSH    PSW
    MOV     R7,A

MOV     A,#4DH
    MOV     SBUF,A
    SETB    P3.1
    JNB     SCON.1,$
    CLR     SCON.1
```

DOCKET NO. 2067

```
        MOV     A,R7
        POP     PSW
        POP     ACC

RETI

****** END OF MS MOUSE FOUND ROUTINE ******

**************************************************************************
*               SEND DATA TO SERIAL PORT FOR X SCAN LINE                  *
**************************************************************************
X_COUNTER:

MOV     TEMP,A
        MOV     R4,A
        MOV     DPTR,#COUNTER_CS
        MOVX    A,@DPTR

CJNE    A,#00H,AND_ZERO
        JMP     END_CHECK_X

AND_ZERO:
        MOV     A,TEMP
        ADD     A,#10H
        MOV     R1,A
        MOV     A,@R1
        MOV     R5,A

CLR     C
        MOV     A,#07H
        SUBB    A,TEMP
        JB      ACC.7,B2
        MOV     A,R5
        XRL     XBYTE0,A
        JMP     END_CHECK_X

B2:
        MOV     A,R5
        XRL     XBYTE1,A

END_CHECK_X:
        MOV     A,TEMP
        RET

******** END OF X_COUNTER ********

**************************************************************************
*               SEND DATA TO SERIAL PORT FOR Y SCAN LINE                  *
**************************************************************************
Y_COUNTER:

MOV     TEMP,A
        MOV     R4,A
        MOV     DPTR,#COUNTER_CS
        MOVX    A,@DPTR

CJNE    A,#00H,AND_ZERO_Y
        JMP     END_CHECK_Y

AND_ZERO_Y:
        MOV     A,TEMP
        ADD     A,#20H
        MOV     R1,A
        MOV     A,@R1
```

DOCKET NO. 2067

```
        MOV     R5,A

CLR     C
        MOV     A,#17H
        SUBB    A,TEMP
        JB      ACC.7,B2_Y
        MOV     A,R5
        XRL     YBYTE0,A
        JMP     END_CHECK_Y

B2_Y:
        MOV     A,R5
        XRL     YBYTE1,A

END_CHECK_Y:
        MOV     A,TEMP
        RET

******* END OF Y_COUNTER ********

**********************************************************************
*                  SEND A TO TEST_CS I/O PORT                         *
**********************************************************************
DISPLAY:
        MOV     DPTR,#TEST_CS
        MOVX    @DPTR,A
        RET
****** END OF DISPLAY ******

**********************************************************************
*             interval time for sending data to decoder               *
**********************************************************************
;---------------- DELAY 10 uS --------------------
TEN_US:
        MOV     R5,#00H
TEN:
        INC     R5
        CJNE    R5,#02H,TEN
        RET DELAY1:
        MOV     R5,#00H
COUNT1:
        INC     R5
        CJNE    R5,#0FFH,COUNT1
        RET DELAY2:
        MOV     R5,#00H
        MOV     R6,#00H
L2:
COUNT2:
        INC     R5
        CJNE    R5,#0FFH,COUNT2
        INC     R6
        MOV     R5,#00H
        CJNE    R6,#0FFH,L2
        RET

****** END OF DELAY ROUTINE ******

;****************************************************************
; Module        DelayX
```

- 54 -

DOCKET NO. 2067

```
; Description    Delay some time
; Input          R5, delay counter
;*****************************************************************
DelayX:
    DEC     R5
    CJNE    R5,#00H,DelayX
    RET ;*****************************************************************
; Module         CmdDecoder
; Description    Command decoder that decode input bit pattern
;                (24 bits) into command.
;
; Input          Xbyte2, Xbyte1, Xbyte0,
;                Ybyte2, Ybyte1, Ybyte0
; Output         A, Command code
;
;*****************************************************************
CmdDecoder:
;       if ((y2 & 0x60) && (y2 & 0x0F) == 0) && (y1 == 0) && (y0 == 0))
;               OnPad Programming mode
;               if ((x0 & 0x06) && ((x0 & 0xF0) == 0)
;                       if (x1 == 0)
;                               if (x2 & 0x60) && (x2 & 0x0F == 0)
;                                       Finger Speed
;                               if (x2 & 0x06) && (x2 & 0xF0 == 0)
;                                       Orientation
;                       if (x2 == 0)
;                               if (x1 & 0x60) && (x2 & 0x0F == 0)
;                                       Sensitivity
;                               if (x1 & 0x06) && (x1 & 0xF0 == 0)
;                                       MaterControl
;       if (y2 == 0) && (y1 == 0) && (y0)
;               Drag lock
;               if (x1 == 0) && (x2 & 0x0F) == 0 && (x0 & 0xF0) == 0
;                       if (x2 & 0x60) && (x0 & 0x06)
;                               Suspend
;                       if (x2 & 0x60) && (x0 == 0)
;                               DragLock
;                       if (x0 & 0x06) && (x2 == 0)
;                               DragLock
;
    RET ;*****************************************************************
; Module         PosDecoder
; Description    Position decoder that decode input bit pattern
;                (24 bits) into position.
;
; Input          R2, R1, R0       ==> 24 bits
; Output         A                ==> 2 - 48, position decoded
;                                 0 -       not defined
;*****************************************************************
PosDecoder:

MOV     B,#00h            ; Clear divider

MOV     DPTR,#PosLookup   ; Load position lookup table
        MOV     A,R2              ; Load high byte
        MOVC    A,@A+DPTR         ; Load position
        JZ      LR2
        ADD     A,#40H            ; Position from high byte
        INC     B                 ; Increment divider
LR2:    MOV     R2,A              ; Store into R2
```

- 55 -

DOCKET NO. 2067

```
            MOV     A,R1              ; Load middle byte
            MOVC    A,@A+DPTR         ; Load position
            JZ      LR1
            ADD     A,#20H            ; Position from middle byte
            INC     B                 ; Increment devider
LR1:        MOV     R1,A              ; Store into R1

MOV     A,R0              ; Load low byte
            MOVC    A,@A+DPTR         ; Load position
            JZ      LR0
            INC     B                 ; Increment devider LR0:        XCH     A,B               ; Xchange A,B
            JZ      L0                ; No touch (divider=0)
            XCH     A,B
            ADD     A,R2
            ADD     A,R1
            DIV     AB

CLR     C                 ; A=A/2
            RRC     A

L0:         RET

;
; Motion Lookup Table 16 entries (0 - 47)
;
MoveLookup:
            DB      000h              ; 0
            DB      001h              ; 1
            DB      004h              ; 2
            DB      009h              ; 3
            DB      010h              ; 4
            DB      019h              ; 5
            DB      024h              ; 6
            DB      031h              ; 7
            DB      040h              ; 8
            DB      051h              ; 9
            DB      064h              ; 10
            DB      079h              ; 11
            DB      07Fh              ; 12
            DB      07Fh              ; 13
            DB      07Fh              ; 14
            DB      07Fh              ; 15

DB      07Fh              ; 16
            DB      07Fh              ; 17
            DB      07Fh              ; 18
            DB      07Fh              ; 19
            DB      07Fh              ; 20
            DB      07Fh              ; 21
            DB      07Fh              ; 22
            DB      07Fh              ; 23
            DB      07Fh              ; 24
            DB      07Fh              ; 25
            DB      07Fh              ; 26
            DB      07Fh              ; 27
            DB      07Fh              ; 28
            DB      07Fh              ; 29
            DB      07Fh              ; 30
            DB      07Fh              ; 31
            DB      07Fh              ; 32
```

- 56 -

DOCKET NO. 2067

```
        DB      07Fh            ;  33
        DB      07Fh            ;  34
        DB      07Fh            ;  35
        DB      07Fh            ;  36
        DB      07Fh            ;  37
        DB      07Fh            ;  38
        DB      07Fh            ;  39
        DB      07Fh            ;  40
        DB      07Fh            ;  41
        DB      07Fh            ;  42
        DB      07Fh            ;  43
        DB      07Fh            ;  44
        DB      07Fh            ;  45
        DB      07Fh            ;  46
        DB      07Fh            ;  47
;
; End MoveLookup
;

;
; Position Lookup Table 256 entries (8 bits) (4 - 32)
;
PosLookup:
        DB      000h            ;   0
        DB      004h            ;   1
        DB      008h            ;   2
        DB      006h            ;   3
        DB      00ch            ;   4
        DB      008h            ;   5
        DB      00ah            ;   6
        DB      008h            ;   7
        DB      010h            ;   8
        DB      00ah            ;   9
        DB      00ch            ;  10
        DB      009h            ;  11
        DB      00eh            ;  12
        DB      00bh            ;  13
        DB      00ch            ;  14
        DB      00ah            ;  15
        DB      014h            ;  16
        DB      00ch            ;  17
        DB      00eh            ;  18
        DB      00bh            ;  19
        DB      010h            ;  20
        DB      00ch            ;  21
        DB      00dh            ;  22
        DB      00bh            ;  23
        DB      012h            ;  24
        DB      00dh            ;  25
        DB      00fh            ;  26
        DB      00ch            ;  27
        DB      010h            ;  28
        DB      00dh            ;  29
        DB      00eh            ;  30
        DB      00ch            ;  31
        DB      018h            ;  32
        DB      00eh            ;  33
        DB      010h            ;  34
        DB      00ch            ;  35
        DB      012h            ;  36
        DB      00dh            ;  37
        DB      00fh            ;  38
```

- 57 -

DOCKET NO. 2067

```
DB      00ch            ;   39
DB      014h            ;   40
DB      00fh            ;   41
DB      010h            ;   42
DB      00dh            ;   43
DB      011h            ;   44
DB      00eh            ;   45
DB      00fh            ;   46
DB      00dh            ;   47
DB      016h            ;   48
DB      010h            ;   49
DB      011h            ;   50
DB      00eh            ;   51
DB      013h            ;   52
DB      00fh            ;   53
DB      010h            ;   54
DB      00eh            ;   55
DB      014h            ;   56
DB      010h            ;   57
DB      011h            ;   58
DB      00eh            ;   59
DB      012h            ;   60
DB      00fh            ;   61
DB      010h            ;   62
DB      00eh            ;   63
DB      01ch            ;   64
DB      010h            ;   65
DB      012h            ;   66
DB      00dh            ;   67
DB      014h            ;   68
DB      00fh            ;   69
DB      010h            ;   70
DB      00dh            ;   71
DB      016h            ;   72
DB      010h            ;   73
DB      011h            ;   74
DB      00eh            ;   75
DB      013h            ;   76
DB      00fh            ;   77
DB      010h            ;   78
DB      00eh            ;   79
DB      018h            ;   80
DB      011h            ;   81
DB      013h            ;   82
DB      00fh            ;   83
DB      014h            ;   84
DB      010h            ;   85
DB      011h            ;   86
DB      00eh            ;   87
DB      015h            ;   88
DB      011h            ;   89
DB      012h            ;   90
DB      00fh            ;   91
DB      013h            ;   92
DB      010h            ;   93
DB      011h            ;   94
DB      00fh            ;   95
DB      01ah            ;   96
DB      013h            ;   97
DB      014h            ;   98
DB      010h            ;   99
DB      015h            ;  100
DB      011h            ;  101
DB      012h            ;  102
```

- 58 -

DOCKET NO. 2067

```
DB      00fh        ; 103
DB      017h        ; 104
DB      012h        ; 105
DB      013h        ; 106
DB      010h        ; 107
DB      014h        ; 108
DB      011h        ; 109
DB      012h        ; 110
DB      00fh        ; 111
DB      018h        ; 112
DB      013h        ; 113
DB      014h        ; 114
DB      011h        ; 115
DB      015h        ; 116
DB      012h        ; 117
DB      012h        ; 118
DB      010h        ; 119
DB      016h        ; 120
DB      012h        ; 121
DB      013h        ; 122
DB      011h        ; 123
DB      014h        ; 124
DB      011h        ; 125
DB      012h        ; 126
DB      010h        ; 127
DB      020h        ; 128
DB      012h        ; 129
DB      014h        ; 130
DB      00fh        ; 131
DB      016h        ; 132
DB      010h        ; 133
DB      011h        ; 134
DB      00eh        ; 135
DB      018h        ; 136
DB      011h        ; 137
DB      013h        ; 138
DB      00fh        ; 139
DB      014h        ; 140
DB      010h        ; 141
DB      011h        ; 142
DB      00eh        ; 143
DB      01ah        ; 144
DB      013h        ; 145
DB      014h        ; 146
DB      010h        ; 147
DB      015h        ; 148
DB      011h        ; 149
DB      012h        ; 150
DB      00fh        ; 151
DB      017h        ; 152
DB      012h        ; 153
DB      013h        ; 154
DB      010h        ; 155
DB      014h        ; 156
DB      011h        ; 157
DB      012h        ; 158
DB      00fh        ; 159
DB      01ch        ; 160
DB      014h        ; 161
DB      015h        ; 162
DB      011h        ; 163
DB      017h        ; 164
DB      012h        ; 165
DB      013h        ; 166
```

- 59 -

DOCKET NO. 2067

```
DB    010h    ; 167
DB    018h    ; 168
DB    013h    ; 169
DB    014h    ; 170
DB    011h    ; 171
DB    015h    ; 172
DB    012h    ; 173
DB    012h    ; 174
DB    010h    ; 175
DB    019h    ; 176
DB    014h    ; 177
DB    015h    ; 178
DB    012h    ; 179
DB    016h    ; 180
DB    012h    ; 181
DB    013h    ; 182
DB    011h    ; 183
DB    017h    ; 184
DB    013h    ; 185
DB    014h    ; 186
DB    011h    ; 187
DB    015h    ; 188
DB    012h    ; 189
DB    013h    ; 190
DB    011h    ; 191
DB    01eh    ; 192
DB    015h    ; 193
DB    017h    ; 194
DB    012h    ; 195
DB    018h    ; 196
DB    013h    ; 197
DB    014h    ; 198
DB    011h    ; 199
DB    019h    ; 200
DB    014h    ; 201
DB    015h    ; 202
DB    012h    ; 203
DB    016h    ; 204
DB    012h    ; 205
DB    013h    ; 206
DB    011h    ; 207
DB    01bh    ; 208
DB    015h    ; 209
DB    016h    ; 210
DB    012h    ; 211
DB    017h    ; 212
DB    013h    ; 213
DB    014h    ; 214
DB    011h    ; 215
DB    018h    ; 216
DB    014h    ; 217
DB    015h    ; 218
DB    012h    ; 219
DB    016h    ; 220
DB    013h    ; 221
DB    013h    ; 222
DB    011h    ; 223
DB    01ch    ; 224
DB    016h    ; 225
DB    017h    ; 226
DB    013h    ; 227
DB    018h    ; 228
DB    014h    ; 229
DB    015h    ; 230
```

- 60 -

DOCKET NO. 2067

```
        DB      012h            ; 231
        DB      019h            ; 232
        DB      015h            ; 233
        DB      016h            ; 234
        DB      013h            ; 235
        DB      016h            ; 236
        DB      013h            ; 237
        DB      014h            ; 238
        DB      012h            ; 239
        DB      01ah            ; 240
        DB      016h            ; 241
        DB      016h            ; 242
        DB      013h            ; 243
        DB      017h            ; 244
        DB      014h            ; 245
        DB      015h            ; 246
        DB      012h            ; 247
        DB      018h            ; 248
        DB      015h            ; 249
        DB      015h            ; 250
        DB      013h            ; 251
        DB      016h            ; 252
        DB      013h            ; 253
        DB      014h            ; 254
        DB      012h            ; 255
;
; End PosLookup
;
        END             ;END OF 8051 PROGRAM
```

Although the present invention has been described in terms of the presently preferred embodiment, it is to be understood that such disclosure is purely illustrative and is not to be interpreted as limiting. For example, while a 80C51 has been disclosed as the preferred microprocessor 218, which in conjunction with the computer program executed by the microprocessor 218 provides means for sensing finger contacts with the active area 22 while also providing a computer port interface means to the computer 42 and the secondary serial port 276 for coupling the auxiliary input device 278 to the computer 42, there exist various other equivalent devices which may be employed for effecting the same operations as those performed by the microprocessor 218. Accordingly, those skilled in the art will recognize that the microprocessor 218 may alternatively be implemented with various different models of microprocessors other than the 80C51, or might also be replaced with a custom designed ASIC or with an appropriately programmed field programmable gate array ("FPGA"). Consequently, without departing from the spirit and scope of the invention, various alterations, modifications, and/or alternative applications of the invention will, no doubt, be suggested to those skilled in the art after having read the preceding disclosure. Accordingly, it is intended that the following claims be interpreted as encompassing all alterations, modifications, or alternative applications as fall within the true spirit and scope of the invention.

What is claimed is:

1. A touch-pad for controlling a position of a cursor appearing on a display screen of a digital computer, the touch-pad comprising:

an active area that responds to finger contact thereto;

finger contact sensing device that is coupled to said active area for sensing a response of said active area to a finger contact, wherein said finger contact sensing device:

senses a velocity at which a finger contacting the touch-pad moves across said active area, the touch-pad responding to a finger contact velocity which exceeds a pre-established threshold by altering a characteristic of data subsequently transmitted from the touch-pad to the digital computer in response to finger contact with said active area; and also senses a direction at which a finger contact to the touch-pad moves across said active area, the touch-pad after sensing a finger contact velocity which exceeds the pre-established threshold altering the characteristic of transmitted data so the cursor continues moving across the display screen of the digital computer in a direction fixed by an initial direction of finger contact movement across the active area even if such contact subsequently becomes stationary; and computer port interface means that is coupled to said finger contact sensing device and that is responsive to finger contact with said active area for transmitting data to a digital computer that indicates finger contact in said active area.

* * * * *